US012463363B2

(12) United States Patent
Yang et al.

(10) Patent No.: US 12,463,363 B2
(45) Date of Patent: Nov. 4, 2025

(54) RELIABLE ELECTRICAL CONNECTOR

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 394 days.

(21) Appl. No.: 18/075,246

(22) Filed: Dec. 5, 2022

(65) Prior Publication Data

US 2023/0178916 A1 Jun. 8, 2023

(30) Foreign Application Priority Data

Dec. 6, 2021 (CN) ......................... 202111476626.6
Dec. 6, 2021 (CN) ......................... 202123036679.4

(51) Int. Cl.

| | |
|---|---|
| ***H01R 12/73*** | (2011.01) |
| ***H01R 13/627*** | (2006.01) |
| *H01R 13/11* | (2006.01) |

(52) U.S. Cl.

CPC ....... *H01R 12/737* (2013.01); *H01R 13/6275* (2013.01); *H01R 13/11* (2013.01)

(58) Field of Classification Search

CPC .. H01R 12/737; H01R 12/721; H01R 12/716; H01R 12/55; H01R 13/2442; H01R 13/245

(Continued)

(56) References Cited

U.S. PATENT DOCUMENTS 3,573,706 A 4/1971 Haberlen
3,970,353 A 7/1976 Kaufman
(Continued)

FOREIGN PATENT DOCUMENTS

CN 1175101 A 3/1998
CN 202633554 U 12/2012
(Continued)

OTHER PUBLICATIONS

International Search Report and Written Opinion mailed Nov. 29, 2021 for International Application No. PCT/CN2021/114671.
(Continued)

*Primary Examiner* — Marcus E Harcum
(74) *Attorney, Agent, or Firm* — Wolf, Greenfield & Sacks, P.C.

(57) ABSTRACT

A card edge connector with members configured to secure a mating component so as to improve the connector's reliability. The connector housing may have a slot configured to receive the mating component. The slot has a first portion configured to receive a front edge of the mating component, and second portions extending from opposite ends of the first portion and configured to receive side edges of the mating component. Members are disposed in the housing and have beams curving into respective second portions of the slot. The beams of the members are configured to restrain movement of the mating component when the mating component is inserted into the slot. Such a configuration enables more reliable connections and improves the connector's shock resistance while being compatible with mating components having a variety of sizes.

20 Claims, 20 Drawing Sheets

(58) Field of Classification Search
USPC .................................................. 439/327, 328
See application file for complete search history.

(56) References Cited

U.S. PATENT DOCUMENTS

| | | | |
|---|---|---|---|
| 4,487,468 A | 12/1984 | Fedder et al. | |
| 4,734,041 A | 3/1988 | Bruchmann et al. | |
| 5,393,247 A | 2/1995 | DiOrazio et al. | |
| 5,478,259 A * | 12/1995 | Noschese | H01R 13/658 439/924.1 |
| 5,580,257 A | 12/1996 | Harwath | |
| 5,810,623 A | 9/1998 | Regnier et al. | |
| 5,876,214 A | 3/1999 | McHugh et al. | |
| 5,997,312 A | 12/1999 | Ho et al. | |
| 6,027,358 A * | 2/2000 | Lai | H01R 12/88 439/327 |
| 6,638,105 B1 | 10/2003 | Wu | |
| 6,645,012 B2 | 11/2003 | Ito et al. | |
| 6,648,682 B1 | 11/2003 | Wu | |
| 6,749,463 B1 | 6/2004 | Fan | |
| 7,008,250 B2 | 3/2006 | Shuey et al. | |
| 7,008,267 B2 | 3/2006 | Fan | |
| 7,074,067 B2 | 7/2006 | Yang et al. | |
| 7,607,949 B2 | 10/2009 | Hsu | |
| 7,637,783 B2 | 12/2009 | Sasaoka et al. | |
| 7,666,011 B2 * | 2/2010 | Lim | H01R 12/7005 439/328 |
| 7,677,907 B2 | 3/2010 | Guan et al. | |
| 7,731,541 B1 | 6/2010 | Lee et al. | |
| 7,892,006 B2 | 2/2011 | Guan et al. | |
| 7,972,171 B2 | 7/2011 | Teh | |
| 8,070,499 B2 * | 12/2011 | Guan | H01R 12/7029 439/155 |
| 8,142,207 B1 | 3/2012 | Ljubijankic et al. | |
| 8,187,031 B2 | 5/2012 | Li et al. | |
| 8,403,689 B2 | 3/2013 | Li et al. | |
| 8,517,746 B2 * | 8/2013 | Manickam | H01R 13/633 439/160 |
| 8,535,077 B2 | 9/2013 | Shen et al. | |
| 9,166,317 B2 | 10/2015 | Briant et al. | |
| 9,190,750 B2 * | 11/2015 | Takeuchi | H01R 12/73 |
| 9,325,090 B2 | 4/2016 | Shen et al. | |
| 9,431,734 B2 | 8/2016 | Guo et al. | |
| 9,666,971 B1 * | 5/2017 | Lai | H01R 12/721 |
| 9,685,723 B2 | 6/2017 | Kee Mew | |
| 9,887,485 B2 | 2/2018 | Lambie et al. | |
| 9,941,621 B2 * | 4/2018 | Tang | H01R 12/714 |
| 10,103,476 B1 | 10/2018 | Qiu et al. | |
| 10,135,165 B2 | 11/2018 | Zuo | |
| 10,224,653 B2 | 3/2019 | Niu et al. | |
| 10,355,408 B2 * | 7/2019 | Tanaka | H05K 7/1409 |
| 10,741,944 B2 | 8/2020 | Long | |
| 10,855,020 B1 | 12/2020 | Phillips et al. | |
| 10,916,894 B2 | 2/2021 | Kirk et al. | |
| 11,374,340 B2 | 6/2022 | Tang | |
| 11,710,923 B2 * | 7/2023 | Hu | H01R 13/6273 439/328 |
| 2005/0042928 A1 | 2/2005 | Yi et al. | |
| 2007/0173118 A1 | 7/2007 | Chen | |
| 2010/0075538 A1 | 3/2010 | Ohshida | |
| 2011/0021080 A1 | 1/2011 | Kamiya et al. | |
| 2011/0065297 A1 | 3/2011 | Guan et al. | |
| 2011/0117768 A1 * | 5/2011 | Li | H01R 12/7029 439/345 |
| 2011/0136388 A1 | 6/2011 | Fu et al. | |
| 2011/0275238 A1 | 11/2011 | Iijima et al. | |
| 2012/0178274 A1 | 7/2012 | Manickam | |
| 2012/0202387 A1 | 8/2012 | McNamara | |
| 2013/0280926 A1 | 10/2013 | Ono | |
| 2016/0020540 A1 | 1/2016 | Shen et al. | |
| 2016/0118736 A1 | 4/2016 | Hoyack et al. | |
| 2016/0190724 A1 | 6/2016 | Mito | |
| 2016/0336667 A1 | 11/2016 | Kee Mew | |
| 2017/0302031 A1 | 10/2017 | Cheng et al. | |
| 2018/0198220 A1 | 7/2018 | Sasame et al. | |
| 2019/0165518 A1 | 5/2019 | Hsu et al. | |
| 2019/0173209 A1 | 6/2019 | Lu et al. | |
| 2019/0173232 A1 | 6/2019 | Lu et al. | |
| 2019/0199023 A1 | 6/2019 | Soh | |
| 2020/0076131 A1 | 3/2020 | Hu et al. | |
| 2020/0076135 A1 | 3/2020 | Tang et al. | |
| 2020/0203867 A1 | 6/2020 | Lu | |
| 2021/0288423 A1 | 9/2021 | Guo et al. | |
| 2021/0351529 A1 | 11/2021 | Yang et al. | |
| 2021/0376508 A1 | 12/2021 | Hu | |
| 2022/0037828 A1 | 2/2022 | Hu et al. | |
| 2022/0069496 A1 | 3/2022 | Yi et al. | |
| 2022/0181809 A1 | 6/2022 | Xie et al. | |
| 2022/0181811 A1 | 6/2022 | Liu et al. | |
| 2022/0247107 A1 | 8/2022 | Tang et al. | |

FOREIGN PATENT DOCUMENTS

| | | |
|---|---|---|
| CN | 203660106 U | 6/2014 |
| CN | 105703103 A | 6/2016 |
| CN | 108539464 A | 9/2018 |
| CN | 212874843 U | 4/2021 |
| CN | 214505858 U | 10/2021 |
| EP | 0820124 A2 | 1/1998 |
| GB | 227943 A | 1/1925 |
| TW | 200835073 A | 8/2008 |
| TW | M475740 U | 4/2014 |
| WO | WO 02/073819 A2 | 9/2002 |

OTHER PUBLICATIONS

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

Hu, Electrical Connector For Compact System, U.S. Appl. No. 17/950,364, filed Sep. 22, 2022.

Yang et al., Electrical Connector, U.S. Appl. No. 17/973,913, filed Oct. 26, 2022.

Yang et al., Electrical Connector, U.S. Appl. No. 17/988,330, filed Nov. 16, 2022.

Yang et al., Field Installable Card Edge Connector, U.S. Appl. No. 18/101,998, filed Jan. 26, 2023.

* cited by examiner

RELIABLE ELECTRICAL CONNECTOR

RELATED APPLICATIONS

This application claims priority to and the benefit of Chinese Application Serial Nos. 202123036679.4 and 202111476626.6, both filed on Dec. 6, 2021. The contents of these applications are incorporated herein by reference in their entirety.

FIELD

The prevent disclosure relates to interconnection systems, such as those including electrical connectors, used to interconnect electronic assemblies.

BACKGROUND

Electrical connectors are used in many electronic systems. It is easier and more cost effective to manufacture a system as separate electronic assemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

Computers, for example, are often manufactured with connectors that serve as sockets for memory cards. A memory card may contain one or multiple memory chips and may be inserted into a socket to increase the available memory in the computer. Memory cards have standardized electrical and mechanical interfaces, as do the memory sockets. Many memory cards, for example, are designed according to a DDR standard, such as DDR4 or DDR5.

Sockets according to those standards have a card slot to receive a memory card and make electrical connections to it. Such sockets typically have an ejector that is mounted at a pivot point in the socket. The upper end of the ejector may be rotated about that pivot point into a position where it engages an opening in the memory card, locking the memory card in the socket. When the upper end of the ejector is rotated away from the socket, the bottom end of the ejector rotates upwards from underneath the memory card, pushing the memory card upwards in the slot so that it can be removed from the socket.

BRIEF SUMMARY

Aspects of the present disclosure relate to reliable electrical connectors.

Some embodiments relate to an electrical connector. The electrical connector may include a housing comprising a slot comprising a first portion and a second portion, a pair of side portions each elongating in a longitudinal direction and at least partially separated by the first portion of the slot, and a tower portion extending in a vertical direction perpendicular to the longitudinal direction and comprising the second portion of the slot; and a member disposed in the tower portion of the housing, the member comprising a beam curving into the second portion of the slot.

Optionally, the member may be electrically floating.

Optionally, the member may comprise a base portion fixedly disposed in the tower portion; and the beam may join the base portion.

Optionally, the electrical connector may include a plurality of conductive elements held in the pair of side portions of the housing, the plurality of conductive elements comprising portions curving into the first portion of the slot.

Optionally, the beam of the member is elastic, and the beam of the member may be configured to be less elastic than the plurality of conductive elements.

Optionally, the member may have a spring constant that is greater than that of the plurality of conductive elements.

Optionally, the beam of the member may have a first width in the longitudinal direction; and the base portion of the member may have a second width in the longitudinal direction that is greater than the first width of the beam of the member.

Optionally, the electrical connector may further comprise a reinforcing member disposed in the tower portion of the housing and at least partially overlapping the member in the vertical direction.

Optionally, the member may be a first member; the electrical connector may comprise a second member configured similar to the first member; and the second member may comprise a beam curving into the second portion of the slot and opposing the beam of the first member.

Some embodiments relate to an electrical connector. The electrical connector may include a housing comprising a pair of side portions each elongating in a longitudinal direction, a portion extending in a vertical direction perpendicular to the longitudinal direction, and a slot at least partially separating the pair of side portions; and a member comprising a first portion fixed to the housing adjacent the portion of the housing extending in the vertical direction and a compliant portion extending into the slot.

Optionally, the portion of the housing may comprise a first groove and a second groove connected to the first groove; the second groove may be disposed between the slot and the first groove; and the first portion of the member may be fixedly disposed in the first groove of the portion of the housing and the compliant portion of the member may be movably disposed in the second groove of the portion of the housing.

Optionally, the first groove of the portion of the housing may have a first width in the longitudinal direction; and the second groove of the portion of the housing may have a second width in the longitudinal direction that is less than the first width of the first groove.

Optionally, the electrical connector may further comprise a latch comprising bearing surfaces engaging complementary bearing surfaces of the portion of the housing. The first groove and second groove of the portion of the housing may be disposed closer to a mating surface than the complementary bearing surfaces of the portion of the housing.

Optionally, the member may further comprise a connecting portion joining the first portion and the compliant portion; the connecting portion of the member may be U-shaped; and the compliant portion and the first portion may be connected to opposite ends of the U-shaped connecting portion.

Optionally, the connecting portion may have a width in the longitudinal direction that is less than the width of the first portion in the longitudinal direction.

Some embodiments relate to an electrical connector. The electrical connector may include an electrical connector comprising a housing comprising a tower portion extending in a vertical direction and a slot, the slot comprising a first portion elongating in a longitudinal direction perpendicular to the vertical direction and a second portion extending in the tower portion in the vertical direction, and one or more members disposed in the tower portion of the housing and comprising a first portion curving into the second portion of the slot of the housing; and a component inserted into the slot of the housing and engaged by the first portion of the one or more members in the second portion of the slot of the housing.

Optionally, the first portion of the one or more members may engage an insulative surface portion of the component inserted into the slot of the housing.

Optionally, the one or more members of the electrical connector may comprise a second portion curving into the second portion of the slot of the housing; and the first portion and second portion of the one or more members may engage the component from opposite sides.

Optionally, the electrical connector may further comprise a latch pivotably connected to the tower portion of the housing. The latch may engage the component at a position farther away from a mounting surface of the electrical connector than the first portion of the one or more members in the vertical direction when the latch is in a locked position.

Optionally, the electrical connector may comprise a plurality of conductive elements having portions curving into the first portion of the slot; and the component may be engaged by the portions of the plurality of conductive elements in the first portion of the slot of the housing.

Some embodiments relate to an electrical connector. The electrical connector may comprise an insulating housing, wherein an mating surface of the insulating housing may be provided with a receiving groove recessed inwards, the receiving groove may be configured for receiving a mating electrical component, the receiving groove extends along a longitudinal direction and may be provided with side walls extending along the longitudinal direction, the side wall may be provided with a member, the member may comprise a clamping jaw, and the beam may extend into the receiving groove, to apply an elastic force to the mating electrical component inserted into the receiving groove.

Optionally, the beam may take the shape of an elastic beam.

Optionally, the beam may comprise a curved portion located in the middle, the curved portion may curve inwards the receiving groove, and the curved portion may extend into the receiving groove such that it may apply an elastic force to the mating electrical component inserted into the receiving groove.

Optionally, the curved portion may comprise a first subportion, an second subportion and a third subportion, the first subportion extends into the receiving groove and may be connected to one end of the second subportion, and the third subportion may extend beyond the receiving groove from the other end of the second subportion.

Optionally, the member may further comprise a base portion connected to the side wall in an inserting manner, and the beam may be connected to the base portion.

Optionally, the beam may be spaced apart from the base portion along a transverse direction, the base portion may be away from the receiving groove relative to the clamping jaw, and one end part of the beam may be connected to the base portion by a connecting portion.

Optionally, the connecting portion may be connected between a first end, away from the mating surface, of the beam and a first end, away from the mating surface, of the base portion.

Optionally, a second end, close to the mating surface, of the base portion may be provided with an opening, a second end, close to the mating surface, of the beam extends towards the opening, and the second end may extend into the opening when the mating electrical component may be inserted into the receiving groove.

Optionally, the connecting portion may be connected between a second end, close to the mating surface, of the beam and a second end, close to the mating surface, of the base portion.

Optionally, a first end, away from the mating surface, of the base portion may be shorter than a first end, away from the mating surface, of the beam.

Optionally, the side wall may be provided with a mounting groove and a beam groove, both the mounting groove and the beam groove extend inwards the insulating housing from the mating surface, the beam groove may be communicated, along a transverse direction, between the mounting groove and the receiving groove, the base portion may be fixed in the mounting groove, and the beam may be moveably disposed in the beam groove.

Optionally, the width in the longitudinal direction of the lower part of the beam groove may be smaller than the width in the longitudinal direction of the mounting groove, and the lower part of the beam groove may be positioned in the middle of the mounting groove along the longitudinal direction.

Optionally, the width in the longitudinal direction of the upper part of the beam groove may be larger than the width in the longitudinal direction of the lower part thereof.

Optionally, the width in the longitudinal direction of the upper part of the beam groove may be equivalent to the width in the longitudinal direction of the mounting groove, and the upper part of the beam groove may be aligned with the mounting groove along the longitudinal direction.

Optionally, the connecting portion may have a U shape, and an end part of the beam and an end part of the base portion may be respectively connected to both ends of the U shape.

Optionally, the width in the longitudinal direction of the connecting portion may be smaller than the width in the longitudinal direction of the base portion.

Optionally, the beam and the base portion may be sequentially disposed along a vertical direction, and one end part of the beam may be connected to the base portion.

Optionally, the other end part of the beam may be shorter, along a transverse direction, than the one end part of the clamping jaw, such that the other end part of the beam may be spaced, along the transverse direction, apart from the base portion, and the middle of the beam may form a curved portion curved inwards the receiving groove.

Optionally, the width in the longitudinal direction of the beam may be smaller than the width in the longitudinal direction of the base portion.

Optionally, the side wall may be provided with a mounting groove and a beam groove, both the mounting groove and the beam groove may extend inwards the insulating housing from the mating surface, the beam groove may be positioned, along the transverse direction, between the mounting groove and the receiving groove, the base portion may be fixed in the mounting groove, and the beam may be moveably disposed in the beam groove.

Optionally, one or both of two side surfaces, opposite along the longitudinal direction, of the base portion may be provided with a first abutting protrusion, and the first abutting protrusion may abut against a side wall of the mounting groove.

Optionally, the one or both of the two side surfaces of the base portion may be provided with a second abutting protrusion, the second abutting protrusion may abut against the side wall of the mounting groove, the second abutting protrusion may be closer to the mating surface than the first abutting protrusion, and the second abutting protrusion may protrude farther than the first abutting protrusion.

Optionally, a surface, facing away from the mating surface, of the second abutting protrusion may be inclined, in a direction facing the mating surface, towards the outer side of the base portion.

Optionally, a surface, facing away from the mating surface, of the first abutting protrusion may be inclined, in a direction facing the mating surface, towards the outer side of the base portion.

Optionally, an edge of the beam may have a rounded corner(s).

Optionally, the electrical connector may be a card edge connector, both ends of the insulating housing of the card edge connector may be provided with a tower portion, and the member may be disposed in the tower portion.

Optionally, the insulating housing may be further internally provided with a reinforcing member, and the reinforcing member may be positioned on the outer side of the member relative to the receiving groove, to resist a pressure generated by the member to the insulating housing.

Optionally, a cross section, perpendicular to a vertical direction, of the reinforcing member may have a U shape, and at least part of the member may be located in an opening of the U shape.

Optionally, the receiving groove may extend into the opening of the U shape.

Optionally, each of two side walls, extending along the longitudinal direction, of the receiving groove may be provided with the member.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
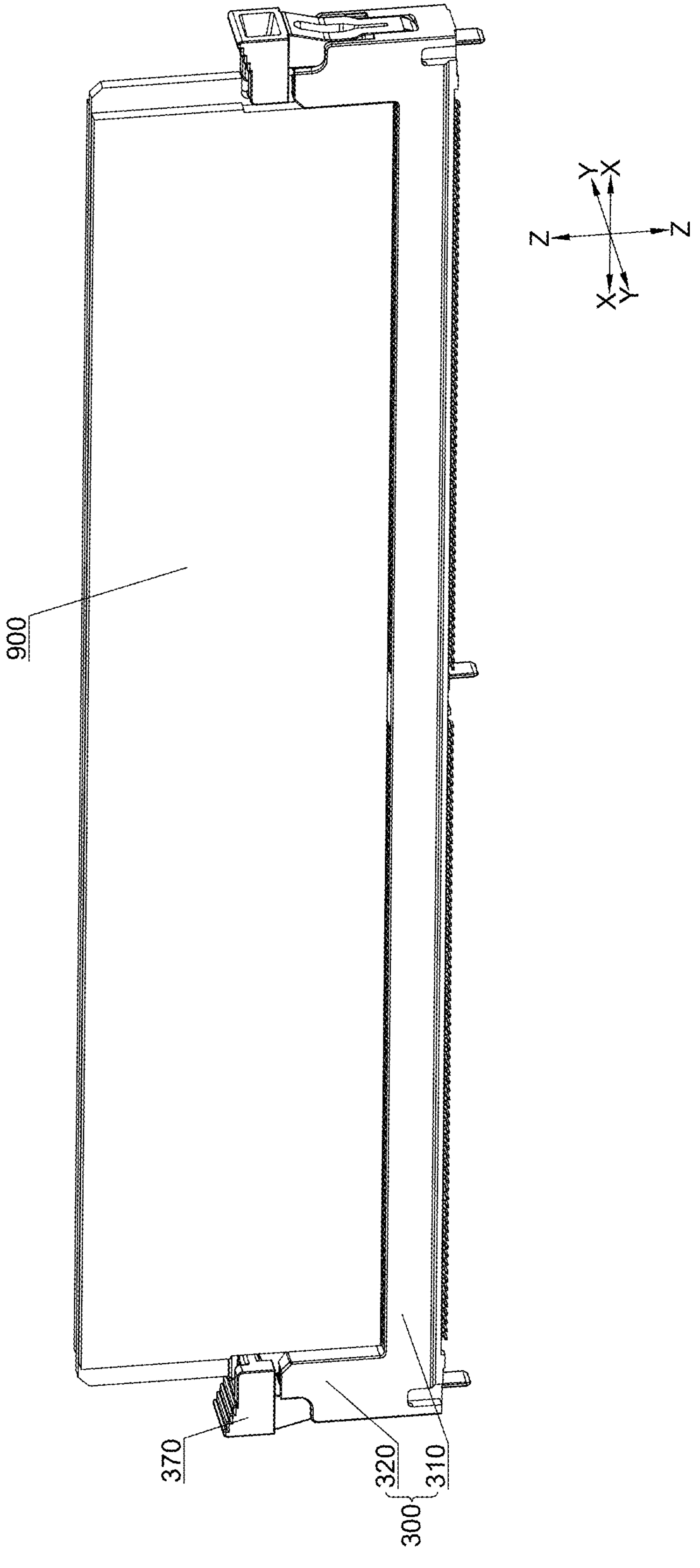
FIG. 1 is a perspective view of an electronic system, illustrating an electrical connector with latches in a locked position, according to some embodiments.

The above accompanying drawings include the following reference numerals:

electrical connector 100; conductive element 110; reinforcing member 200; opening 201; transverse part 210; first longitudinal part 221; second longitudinal part 222; elastic part 230; first gripping part 241; second gripping part 242; first extension part 251; second extension part 252; first arc transition part 261; second arc transition part 262; first protrusion 271; second protrusion 272; third protrusion part 273; insulating housing 300; mating surface 301; mounting surface 302; side portion 310; tower portion 320; receiving groove 330; first portion 331; second portion 332; separation rib 333; insertion slot 340; first step 351; second step 352; first recess 361; second recess 362; third recess 363; latch 370; side wall 380; first side wall 381; second side wall 382; mounting groove 391; beam groove 392; accommodating groove 393; platform 394; members 500, 500', 500", 500"; beams 510, 510"; first end 511, 511', 511"; second end 512, 512', 512"; rounded corner 513; curved portions 520, 520"; first subportion 521; second subportion 522; third subportion 523; base portions 530, 530"; first ends 531, 531', 531"; second ends 532, 532', 532"; opening 533; connecting portions 540, 540'; first abutting protrusion 550; surfaces 551, 552, 553; second abutting protrusion 560; surfaces 561, 562, 563; electronic card 900; and 1002 bearing surface.

DETAILED DESCRIPTION

The Inventors have recognized and appreciated design techniques to enable more reliable connectors. The Inventors have recognized and appreciated that undesired movement of mated components in a system with respect to each other may occur during use of the system as a result of vibration, shaking, etc. For example, a card edge connector is an example of a connector used for interconnection of printed circuit boards in an electronic system. Dual In-line Memory Module (DIMM) is an example of a memory used in computers. DIMM may be connected to a mainboard of a computer through the card edge connector. The card edge connector may be mounted on the mainboard, and conductors on the card edge connector may be connected to a circuit of the mainboard. A DIMM, sometimes called a memory card, may be inserted into a slot of the card edge connector. To secure the connection between the memory card and the card edge connector, the card edge connector may include one or more latches. The latches may be pivotably disposed in respective tower portions at opposite ends of an insulating housing of the card edge connector. After the memory card is inserted into the insulating housing, the latches may be moved to locked positions such that the memory card is secured in the card edge connector. The memory card may have notches on opposite sides corresponding to opposite sides of the slot of the card edge connector. When the latches are pivoted to the locked positions, parts of the latches may extend into the notches to engage edges of the notches so as to lock the memory card to the card edge connector.

The Inventors have recognized and appreciated that the memory card may move relative to the card edge connector because of movement of the system such as vibration in a working environment, which may weaken the connection between the memory card and the card edge connector and/or disengage the card edge connector from the card edge connector. The Inventors have further recognized and appreciated that gaps may exist between side edges of the memory card and the tower portions of the insulating housing of the card edge connector, which may cause the memory card to move in the tower portions, even if a bottom edge of the memory card is clamped by conductive elements of the connector when inserted into the slot of the insulating housing and mated with the conductive elements and the edges of the notches of the memory card is engaged by the latches of the connector when the latches is in the locked position. The Inventors have recognized and appreciated that reducing or eliminating the gaps between the memory card and the tower portions of the insulating housing of the card edge connector may therefore improve the stability of the interconnection system by reducing the risk that the memory card moves with respect to the card edge connector. Gaps may be reduced by compliant members within a slot of the connector to fill gaps between a card and the insulating housing when the card is inserted in the slot, and thereby provide mechanical support to the card.

In an embodiment of the present disclosure, the insulating housing may be provided with one or more members disposed on a side wall of a slot of the card edge connector configured to receive a memory card. The members may have beams configured to engage the memory card when the memory card is inserted into the slot of the card edge connector. The beams may be sufficiently stiff to provide mechanical support to the memory card. In this way, the memory card may be tightly connected to the insulating housing through the members, and may not move relative to the insulating housing even if there is a spacing between the memory card and the side wall of the slot. Such a configuration enables more reliable connections and improves the connector's shock resistance while being compatible with cards having a variety of thicknesses. Further, the members may also improve the mechanical strength of the insulating housing.

Such techniques may be integrated into an electrical connector 100. As shown in FIGS. 1-2 and 4-5, the electrical connector 100 may include an insulating housing 300. A vertical direction Z-Z, a longitudinal direction X-X and a transverse direction Y-Y are shown in the figures. The vertical direction Z-Z, the longitudinal direction X-X and the transverse direction Y-Y may be perpendicular to each other. The vertical direction Z-Z may refer to a height direction of the electrical connector 100. The longitudinal direction X-X may refer to a length direction of the electrical connector 100. The transverse direction Y-Y may refer to a width direction of the electrical connector 100.

The insulating housing 300 may be provided with an mating surface 301 and a mounting surface 302 which may be opposite to each other in the vertical direction Z-Z. The mating surface 301 may be provided with a receiving groove 330. Exemplarily, the receiving groove 330 may be recessed inwards, in the vertical direction Z-Z, from the mating surface 301. Specifically, the receiving groove 330 may extend along the longitudinal direction X-X. The receiving groove 330 may be used for receiving at least part of a mating electrical component, to maintain the position of the mating electrical component relative to the insulating housing 300. The mating electrical component may include, but not limited to, an electronic card. The electronic card may include one or more of a display card, a memory card, a sound card and the like. In some embodiments, the mating electrical component may further include a mating electrical connector. For example, if the electrical connector 100 is a socket electrical connector, the mating electrical connector may be a plug electrical connector. The present disclosure describes below with an electronic card as an example of the mating electrical component.

The insulating housing 300 may have a longitudinal strip shape. The insulating housing 300 may extend along the longitudinal direction X-X. The receiving groove 330 may be a long and thin slot extending along the longitudinal direction X-X. The electronic card 900 may be inserted into the receiving groove 330 from the mating surface 301, referring to FIGS. 1-2 and 4. The mounting surface 302 may be configured to face a printed circuit board (e.g., a backplane), such that the electronic card 900 may be electrically connected to the printed circuit board by the electrical connector 100, and a circuit on the electronic card and a circuit on the printed circuit board may be interconnected. The insulating housing 300 may be provided with a plurality of conductive elements 110. The plurality of conductive elements 110 may be disposed, along the longitudinal direction X-X, in a first side portion 310 and a second side portion 310 spaced from each other such that adjacent conductive elements 110 may be electrically insulated from each other. The electronic card 900 may be provided with conductive elements (for example, golden fingers). Front ends of the plurality of conductive elements 110 extend into the receiving groove 330. When an edge of the electronic card 900 is inserted into the receiving groove 330, the front ends of the plurality of conductive elements 110 may be electrically connected to conductive elements on the electronic card 900. Rear ends of the plurality of conductive elements 110 may extend beyond the mounting surface 302 of the electronic card 900. When the electrical connector 100 is connected to the printed circuit board (unillustrated), rear ends of the plurality of conductive elements 110 may be electrically connected to the circuit on the printed circuit board.

Figure 2:
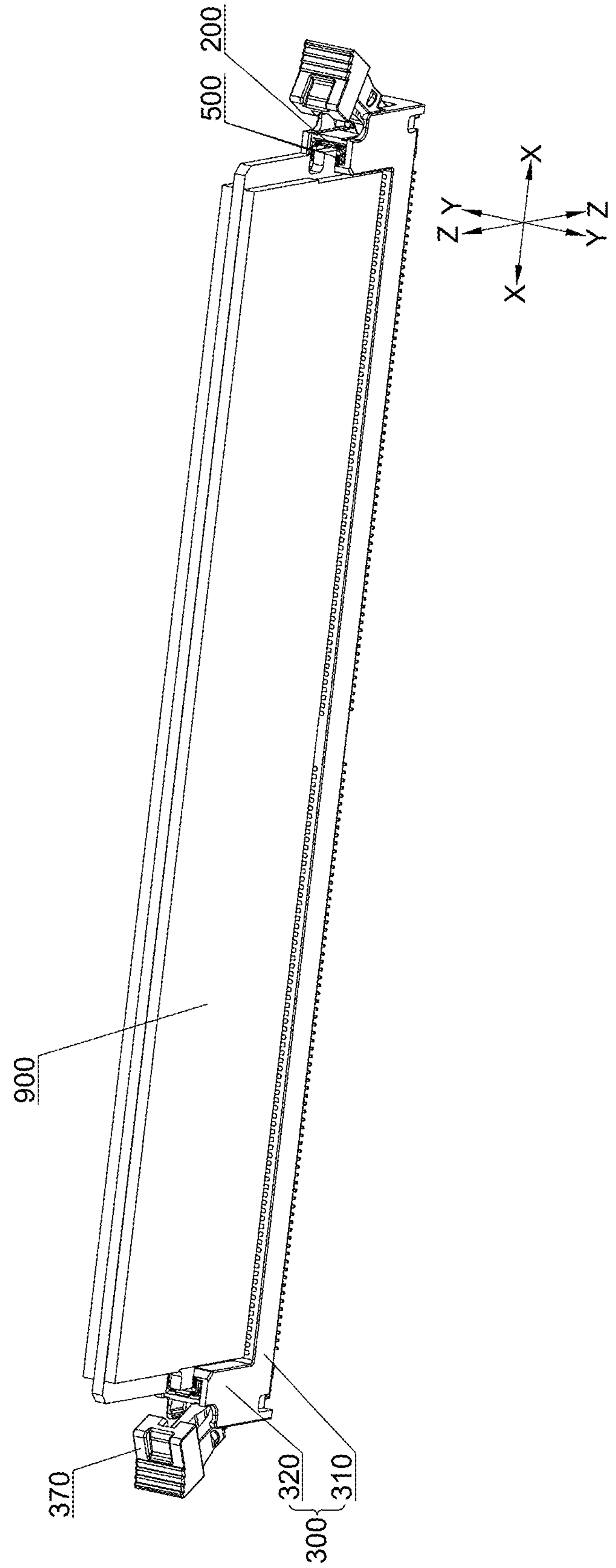
FIG. 2 is a perspective view of the electronic system shown in FIG. 1, illustrating the electrical connector with the latches in an unlocked position.

Orientation terms used herein may be relative to the placement of the electrical connector 100 shown in FIGS. 1-2. The side on which the mating surface 301 is located may be the upper side and the side on which the mounting surface 302 is located may be the bottom side. The receiving groove 330 may be disposed, in the longitudinal direction X-X, on the insulating housing 300 in an extending manner. The insulating housing 300 may be formed by an insulating material such as plastic by a molding process. The insulating housing 300 may be an integral member.

The insulating housing 300 may include a pair of side portions 310 and a pair of tower portions 320. The pair of side portions 310 may extend along the longitudinal direction X-X. The pair of tower portions 320 may be respectively connected to both ends of the pair of side portions 310. The tower portions 320 may extend along the vertical direction Z-Z. Both ends of the receiving groove 330 may respectively extend into the pair of tower portions 320. In the longitudinal direction X-X, the length of the receiving groove 330 may be greater than the length of the side portion 310, such that both ends of the receiving groove 330 extend beyond the side portions 310 and into the tower portions 320. The mating surface 301 may be formed on the side portions 310 and the tower portions 320; and the mounting surface 302 may similarly formed on the side portions 310 and the tower portions 320.

Figure 4:
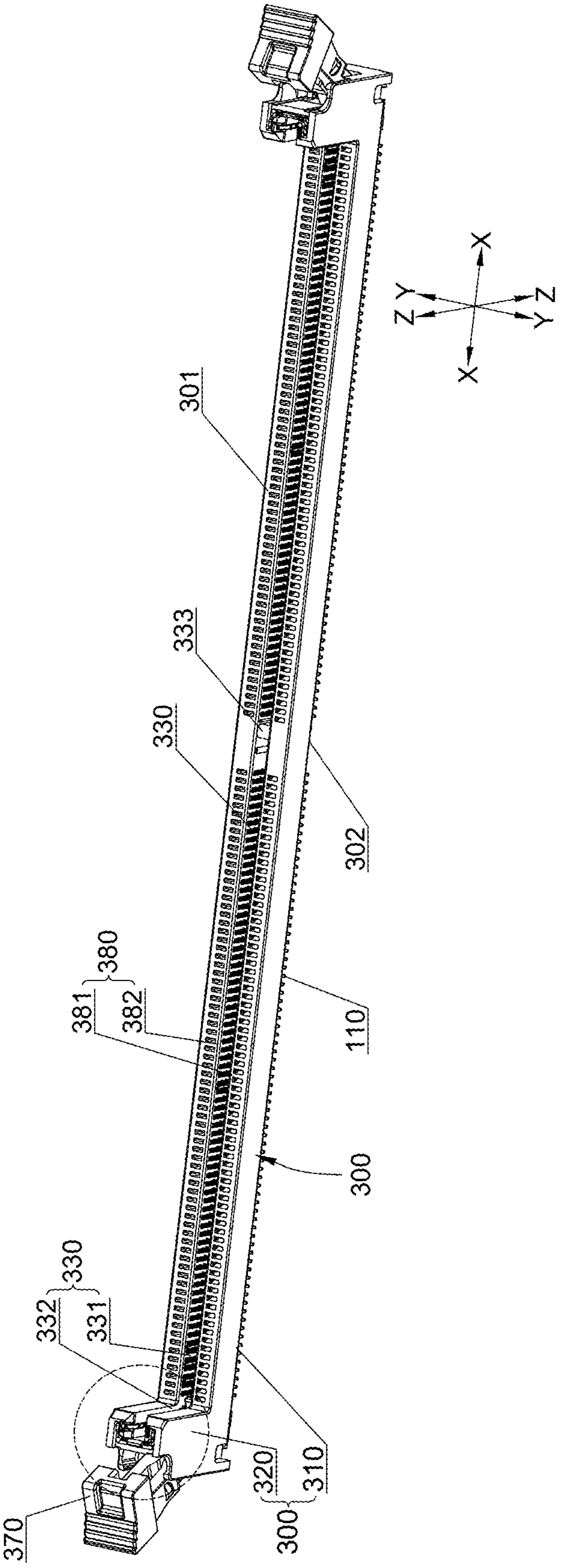
FIG. 4 is a perspective view of the electrical connector of FIG. 1.
Figure 5:
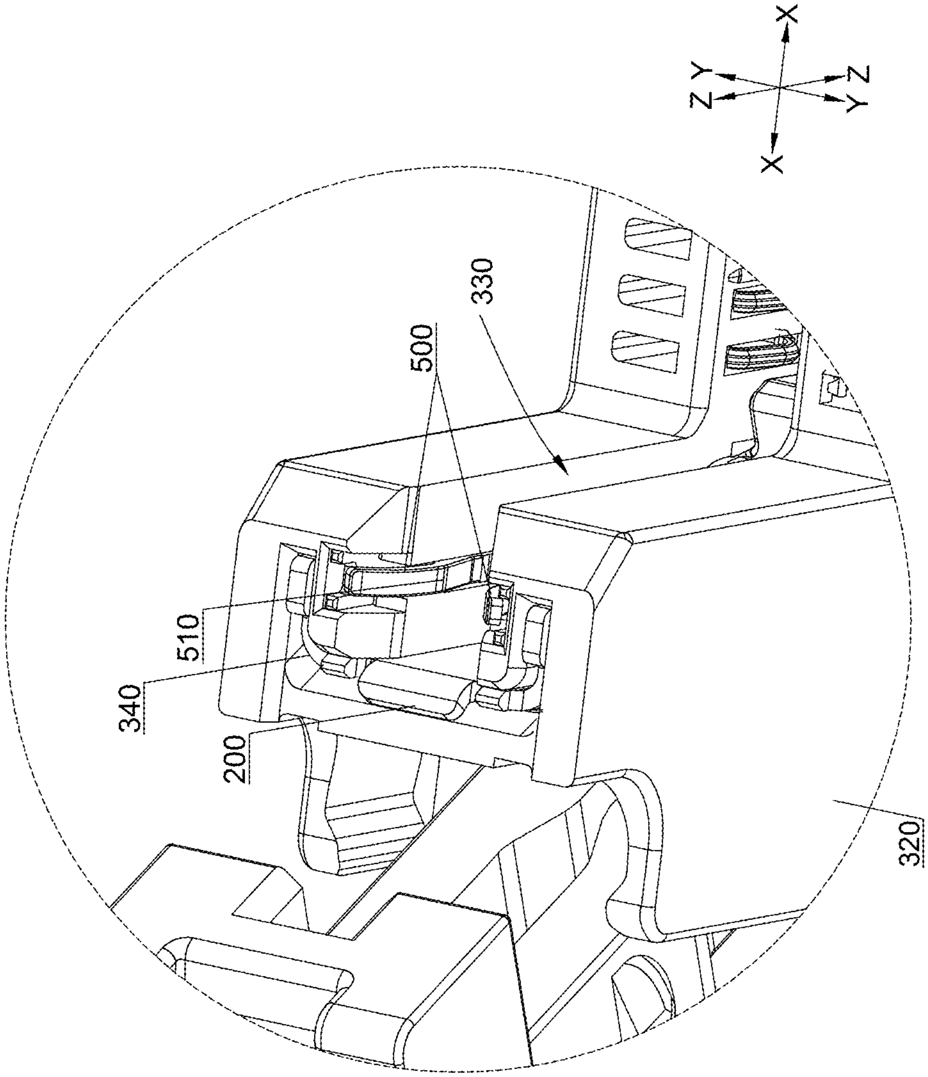
FIG. 5 is an enlarged view of a circled portion of the electrical connector shown in FIG. 4.
Figure 6:
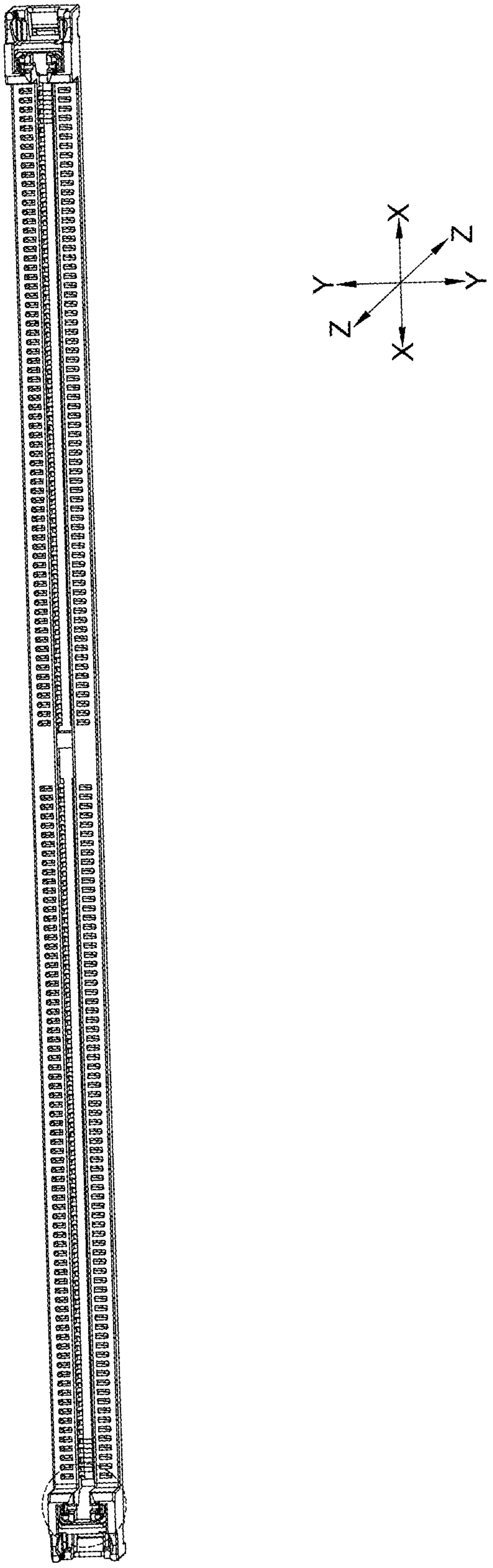
FIG. 6 is a top perspective view of an insulating housing of the electrical connector of FIG. 4.
Figure 7:
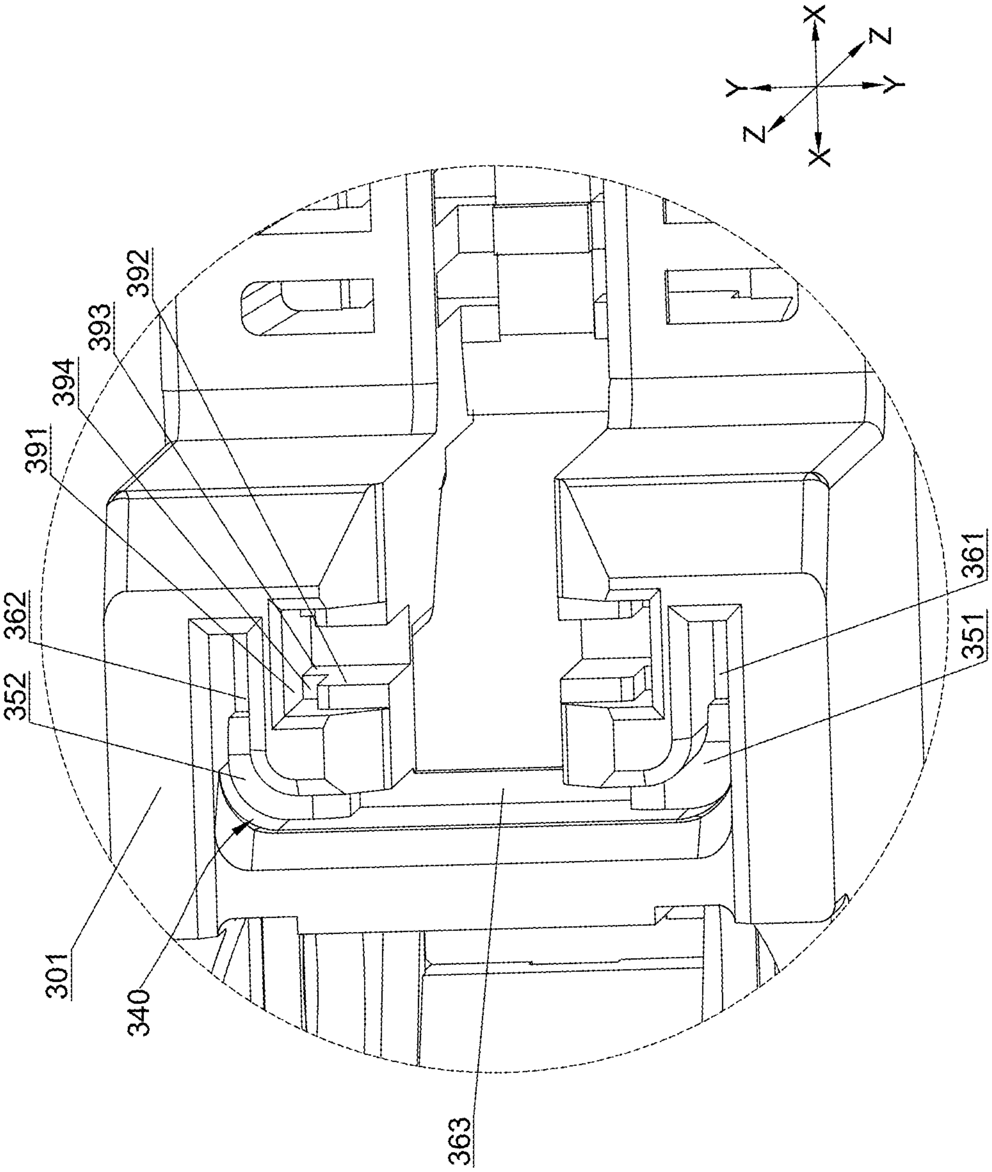
FIG. 7 is an enlarged view of a circled portion of the insulating housing shown in FIG. 6.
Figure 8:
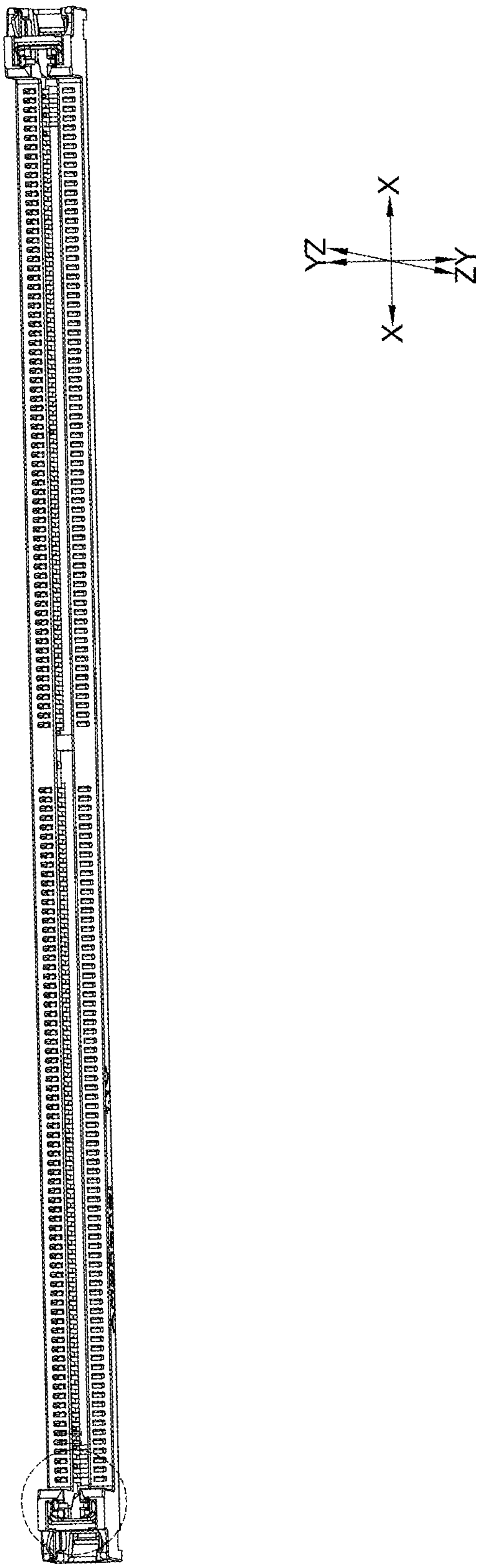
FIG. 8 is another top perspective view of the insulating housing of FIG. 6.
Figure 9:
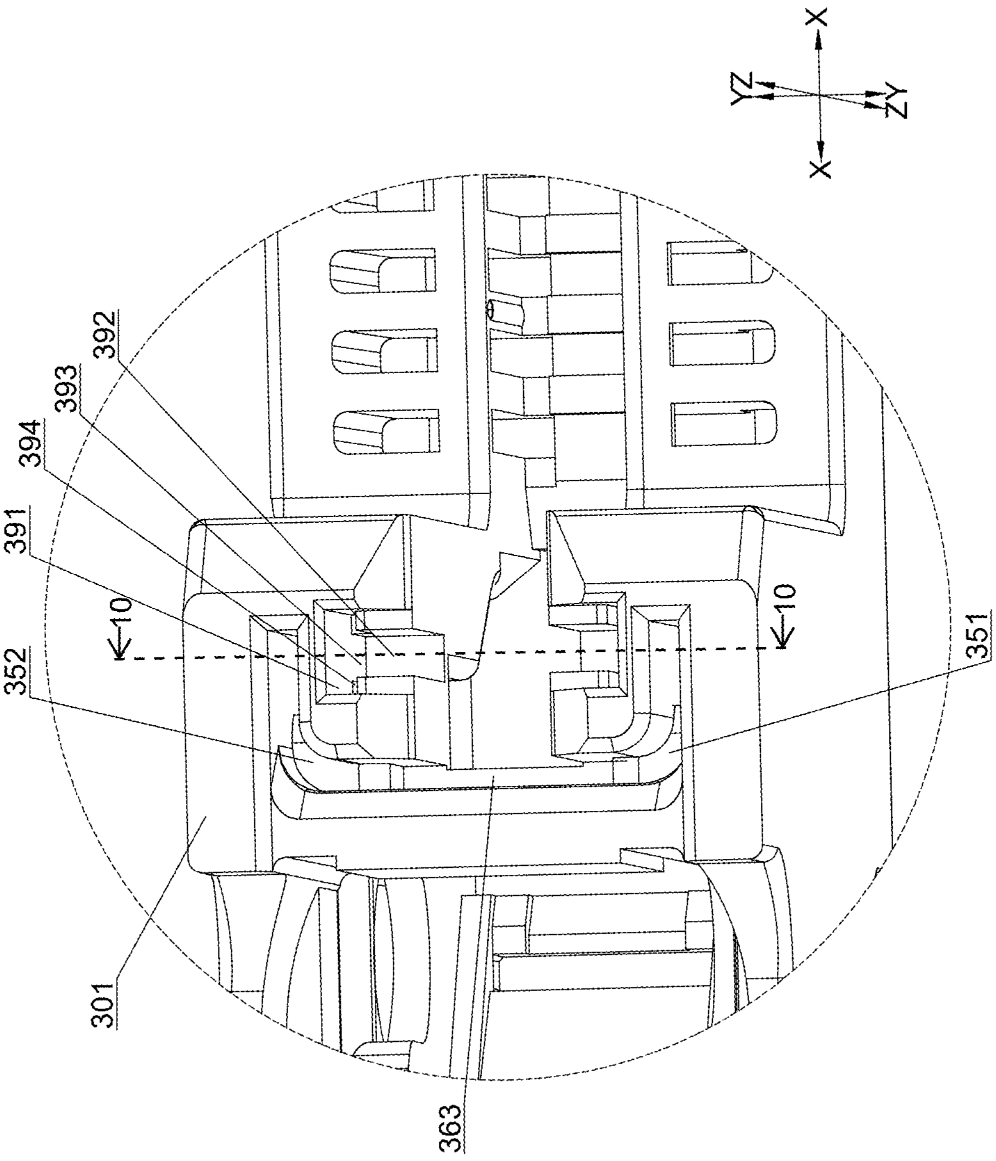
FIG. 9 is an enlarged view of a circled portion of the insulating housing shown in FIG. 8.
Figure 11:
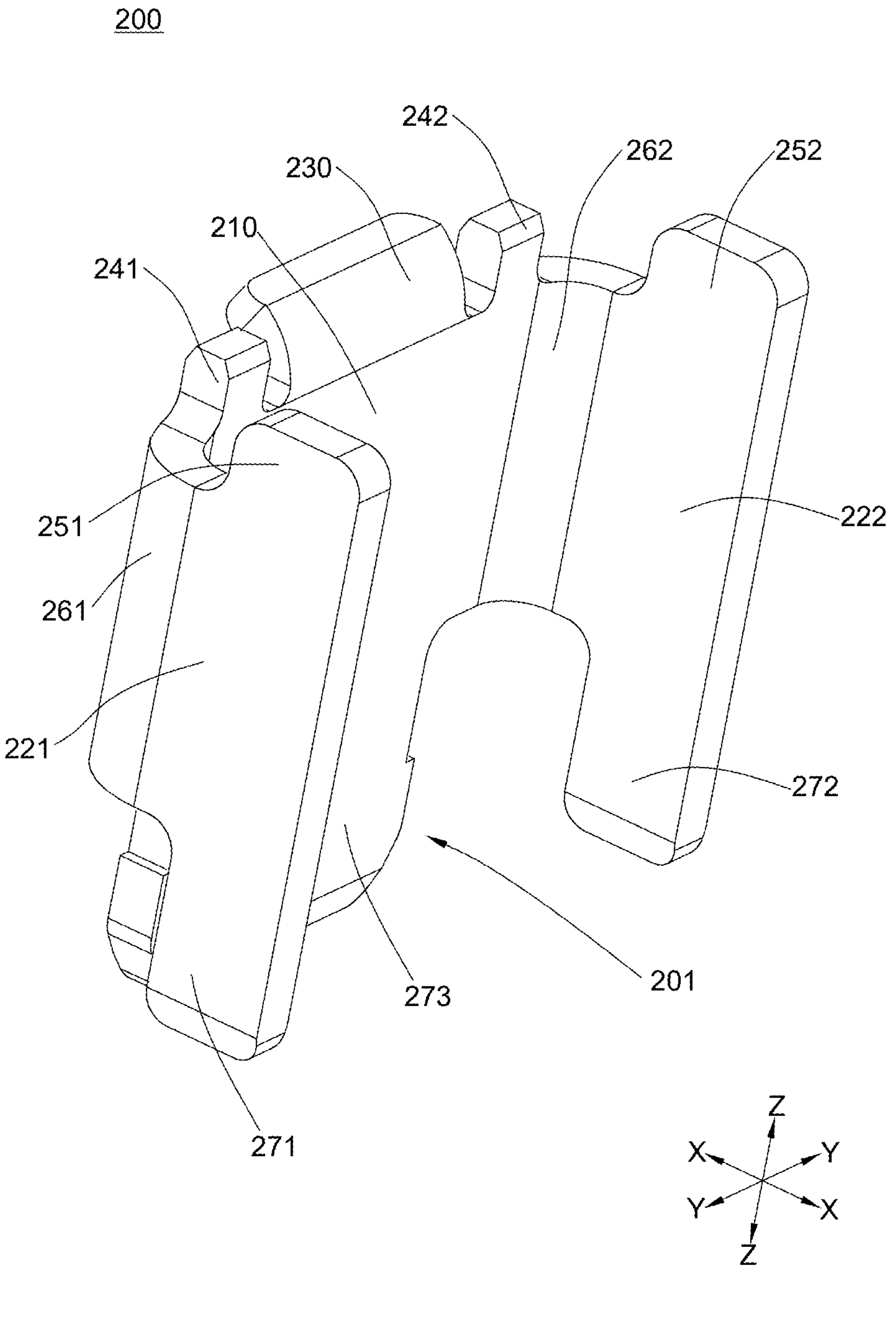
FIG. 11 is a perspective view of a reinforcing member of the electrical connector of FIG. 4.

As shown in FIGS. 4-5 and FIG. 11, a reinforcing member(s) 200 may be disposed in one or both of the tower portions 320. In an exemplary embodiment, an insertion slot 340 may be formed in the tower portions 320. The reinforcing member 200 may be inserted into the insertion slot 340. A cross section of the reinforcing member 200 may be U-shaped. The cross section refers to a section which may be formed by cutting the reinforcing member 200 with a plane perpendicular to the vertical direction Z-Z. An opening 201 of the U shape may face a receiving groove 330. The end part of the receiving groove 330 may extend into the opening 201 of the U-shape. Two ends of the U shape may be respectively located on two sides of the receiving groove 330 in the transverse direction Y-Y. When viewed in the vertical direction Z-Z, the reinforcing member 200 may at least partially surround the end part of the receiving groove 330. The shape of the reinforcing member 200 may be adaptive with that of the insertion slot 340. As shown in FIG. 5, the insertion slot 340 may at least partially surround the end part of the receiving groove 330, such that the reinforcing member 200 may at least partially surround the end part of the receiving groove 330. Optionally, the reinforcing member 200 may be disposed only in one tower portion 320; or two reinforcing members 200 may be disposed in the two tower portions 320, respectively. Having two reinforcing members 200 disposed in the two tower portions 320 respectively may enable the two reinforcing members 200 to at least partially surround two ends of the receiving groove 330, respectively.

The receiving groove 330 may extend into the tower portions 320, which may affect the strength of the tower portions 320. By providing the reinforcing members 200 in the tower portions 320, the tower portions 320 may be strengthened and have improved impact resistance. For a card edge connector, a longitudinal length of the entire receiving groove 330 may be greater than a transverse width. The tower portions 320 may be likely to deform or crack when subjected to an impact force in the transverse direction Y-Y. The end parts of the receiving groove 330 may extend into the U-shaped opening 201 of the reinforcing member 200. In this way, when the electronic card 900 is inserted into the receiving groove 330, the reinforcing member 200 may maintain the shape of the tower portions 320 at the ends of the electronic card in the transverse direction Y-Y, so as to avoid deformation or cracking of the tower portions 320 when the electronic card 900 is impacted by an external force. The vertical height of the tower portions 320 may be greater than the vertical height of the side portions 310. The increased strength of the tower portions 320 may therefore share the impact force on the side portions 310, and also strengthen the pair of side portions 310, thereby improving their impact resistances. Te resistance to the impact force in the transverse direction Y-Y may be improved, thereby protecting the insulating housing 300 to a certain extent and reducing the risk of the insulating housing 300 to deform or crack.

The reinforcing member 200 may be inserted into the insertion slot 340 in any suitable direction, such as the longitudinal direction X-X (not shown) or the vertical direction Z-Z (as shown). When the reinforcing member 200 is installed into the tower portions 320 in different directions, the insertion slot 340 may have different shapes and structures. When the reinforcing member 200 is inserted into the insertion slot 340 in the longitudinal direction X-X, the insertion slot 340 may extend to the outer side surface of the tower portions 320 in the longitudinal direction X-X. In this way, the reinforcing member 200 may be inserted into the insertion slot 340 from the outer side surface. When the reinforcing member 200 is inserted into the insertion slot 340 in the vertical direction Z-Z, the insertion slot 340 may extend to the mating surface 301 or the mounting surface 302 of the tower portions 320 in the vertical direction Z-Z. In this way, the reinforcing member 200 may be inserted into the insertion slot 340 from the mating surface 301 or the mounting surface 302.

The reinforcing member 200 may be made of a high-strength material, such as plastic, ceramic, metal and so on. The reinforcing member 200 may be made of a metal material, which may have higher strength, and lower material cost and processing cost. The reinforcing member 200 may be an integral sheet metal piece. In this way, the reinforcing member 200 may have higher strength, accompanied with simpler processing technology and lower cost. The insulating housing 300 and the reinforcing member 200 may be made of different materials. The reinforcing member 200 may be inserted into the insertion slot 340. The insulating housing 300 and the reinforcing member 200 may be separately manufactured and then assembled, thereby facilitating manufacturing and installation, and reducing the cost of the electrical connector 100.

The reinforcing member 200 may be installed in the tower portions 320 in a non-plugging manner. Alternatively or additionally, a portion of the reinforcing member 200 may be embedded in the insulating housing 300 while the insulating housing 300 is molded, such as via an insert molding operation. Insert molding may incur higher cost in comparison to, for example, injection molding of the insulating housing 300, but may be desirable in some scenarios, as it avoids a separate insertion step of inserting the reinforcing member 200 into the housing 300 and/or may provide desirable mechanical properties.

Further, as shown in FIGS. 4-5, the insertion slot 340 extends to the mating surfaces 301 of the tower portions 320. The reinforcing member 200 may be inserted into the insertion slot 340 from the mating surfaces 301. Since the mating surfaces 301 of the tower portions 320 refers to a side where the electronic card 900 is inserted into the receiving groove 330, and this side has a larger field of view and operation space, the reinforcing member 200 may be inserted into the insertion slot 340 from the mating surface 301, which may be more convenient to operate and may achieve better user experience. In addition, whether the reinforcing member 200 is properly inserted into the insertion slot 340 may also be checked from the mating surface 301.

As shown in FIGS. 6-9, a first step 351 and a second step 352 may be disposed at the bottom of the insertion slot 340. The first step 351 and the second step 352 may be spaced apart in the transverse direction Y-Y. A first recess 361 and a second recess 362 may be respectively formed on two sides of the first step 351 and the second step 352. A third recess 363 may be formed between the first step 351 and the second step 352. The first recess 361 and the second recess 362 may be respectively located on two sides of the insertion slot 340 in the transverse direction Y-Y. The lower portion of the reinforcing member 200 may be adaptive with the bottom of the insertion slot 340. Correspondingly, as shown in FIG. 11, the lower portion of the reinforcing member 200 may be provided with a first protrusion 271, a second protrusion 272 and a third protrusion 273. The first protrusion 271, the second protrusion 272, and the third protrusion 273 may be inserted into the first recess 361, the second recess 362, and the third recess 363, respectively. The first step 351 and the second step 352 may be same or different in shape and size. The first recess 361 and the second recess 362 may be same or different. With the first step 351 and the second step 352, the thickness of the bottoms of the tower portions 320 may be increased, the structural strength of the tower portions 320 may be improved, and the reinforcing member 200 may be better supported to reduce the risk that it impacts the circuit board. In addition, with the first recess 361, the second recess 362, and the third recess 363, the size of the reinforcing member 200 in the vertical direction Z-Z may be extended as much as possible, and the insulating housing 300 may be protected to a larger extent from deforming or cracking.

As shown in FIGS. 6-9, the depth of the third recess 363 may be greater than the depth of the first recess 361 and the depth of the second recess 362. In this way, an insertion depth of a main portion of the reinforcing member 200 may be increased, which may be beneficial to increase the vertical height of the opening 201, ensure the interference force of the reinforcing member 200, and protect the tower portions 320 to a larger extent from deforming or cracking.

Optionally, the depth of the third recess 363 may be less than or equal to the depth of the first recess 361 and the depth of the second recess 362.

As shown in FIG. 11, the reinforcing member 200 may include a transverse part 210, a first longitudinal part 221 and a second longitudinal part 222. The transverse part 210 extends in the transverse direction Y-Y. The first longitudinal part 221 and the second longitudinal part 222 may extend in the longitudinal direction X-X from two ends of the transverse part 210. The first longitudinal part 221 and the second longitudinal part 222 may be same or different. The first longitudinal part 221 and the second longitudinal part 222 may be spaced apart to form the U-shaped opening 201. The aforementioned first protrusion 271, the second protrusion 272, and the third protrusion 273 may be disposed on the transverse part 210, the first longitudinal part 221 and the second longitudinal part 222, respectively. The reinforcing member 200 may further include an elastic part 230. The elastic part 230 may be bent from the top of the transverse part 210 toward a direction away from the receiving groove 330. A curvature radius of the elastic part 230 may be arbitrary. The elastic part 230 may abut against the insertion slot 340. In an exemplary embodiment, the first longitudinal part 221, the second longitudinal part 222, the elastic part 230 and the transverse part 210 may be joined together by, for example, welding, bonding, etc., or may be integrally formed. The elastic part 230 may play a guiding role. When the electronic card 900 is inserted into the receiving groove 330 in the vertical direction Z-Z, the elastic part 230 may protect the electronic card 900 from being scratched. The electronic card 900 may be effectively inserted into the receiving groove 330.

Optionally, as shown in FIG. 11, the reinforcing member 200 may further include a first extension part 251 and a second extension part 252. The first extension part 251 and the second extension part 252 extend upward from the first longitudinal part 221 and the second longitudinal part 222, respectively. The first extension part 251 and the second extension part 252 may be same or different. In an exemplary embodiment, the first extension part 251 and the first longitudinal part 221, as well as the second extension part 252 and the second longitudinal part 222 may be spliced together by, for example, welding, bonding, etc., or may be integrally formed. The first extension part 251 and the second extension part 252 may increase a vertical size of the reinforcing member 200 as much as possible so as to enhance the resistance of the reinforcing member 200 to an impact force, so that the insulating housing 300 may be better protected from deforming or cracking.

As shown in FIG. 11, the transverse part 210 and the first longitudinal part 221 may be connected by a first arc transition part 261. The transverse part 210 and the second longitudinal part 222 may be connected by a second arc transition part 262. A curvature radius of the first arc transition part 261 and a curvature radius of the second arc transition part 262 may be arbitrary. In this way, the reinforcing member 200 may be easily processed and formed from a plate, and the production cost thereof may be relatively lower.

In the illustrated embodiment, as shown in FIG. 4, the receiving groove 330 may extend from the side portion 310 into the tower portions 320. The receiving groove 330 may include a first portion 331 and second portions 332. The first portion 331 may be located between the pair of side portions 310, and extends in the longitudinal direction X-X. The first portion 331 of the receiving groove 330 may be provided with a separation rib 333, which may separate the first portion 331 of the receiving groove 330 into multiple independent sections. The separation rib 333 may improve the mechanical strength of the side portions 310, and may also provide a fool-proofing function by arranging the separation rib 333 in non-center positions of the first portion 331 of the receiving groove 330. The side portion 310 may be provided with the conductive element 110, which may electrically connect the electronic card 900 with a circuit board. Each tower portion 320 may be provided with a second portion 332 of the receiving groove 330. A pair of second portions 332 of the receiving groove 330 may be respectively positioned on side surfaces of the pair of tower portions 320 facing each other, and the pair of second portions 332 of the receiving groove 330 may extend along the vertical direction Z-Z. Lower ends of the pair of second portions 332 may be respectively connected to both ends of the first portion 331. In this way, the U-shaped receiving groove 330 may be formed.

Figure 10:
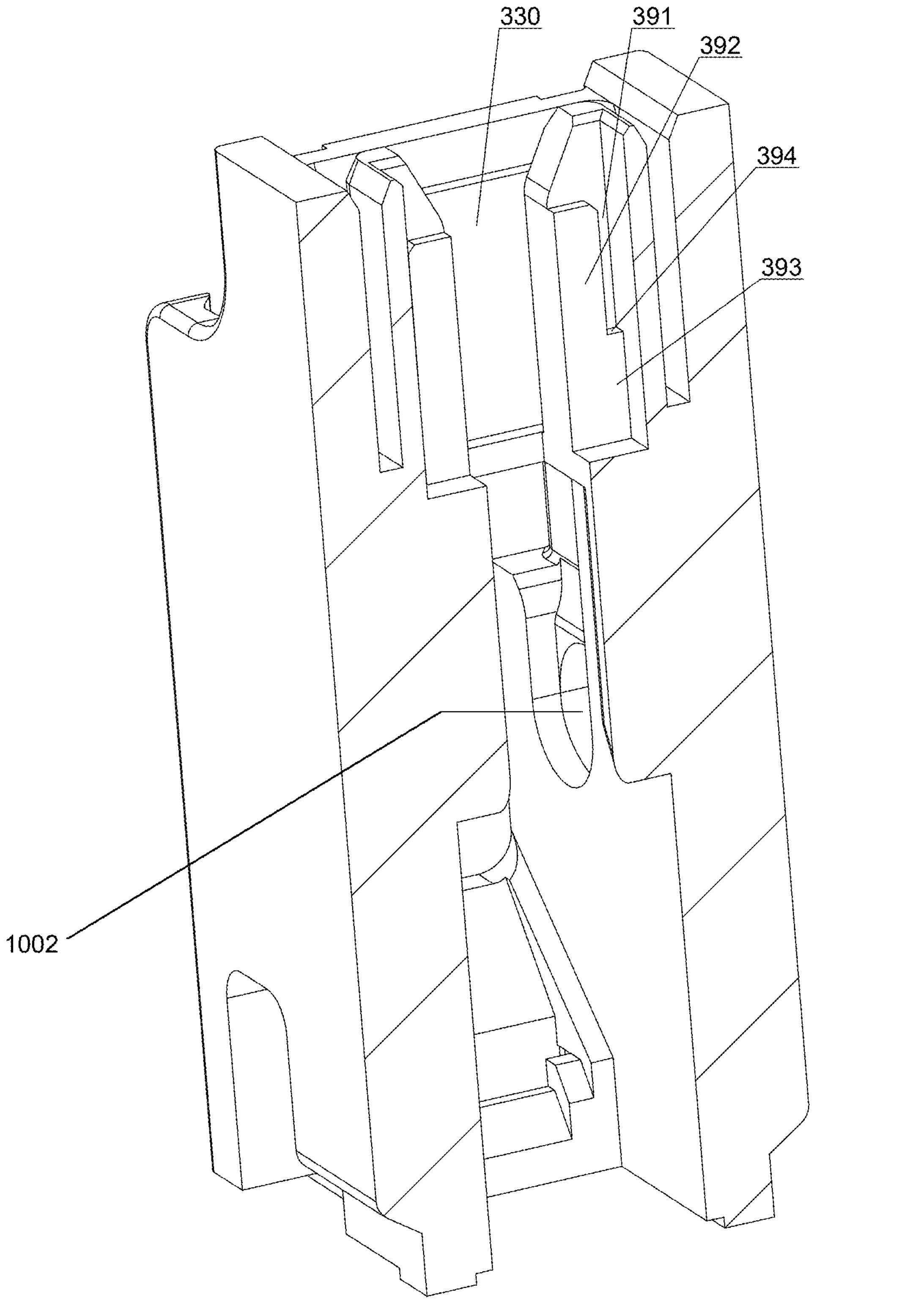
FIG. 10 is a cross-sectional perspective view of the insulating housing shown in FIG. 8 along a line marked "10-10" in FIG. 9.

As shown in FIGS. 1-2 and FIG. 4, the electrical connector 100 may further include a pair of latches 370. The pair of latches 370 may be connected to the pair of tower portions 320 respectively. The latches 370 may be detachably or pivotally connected to the tower portions 320. For example, the latches 370 may have bearing surfaces configured to engage complementary bearing surfaces 1002 (shown in FIG. 10) of the insulating housing 300. Exemplarily, the latches 370 may be pivoted between a locked position and an unlocked position. In FIG. 1, the latches 370 are shown in the locked position, and the latches 370 may be capable of locking the electronic card 900 to the electrical connector 100. In FIG. 2, the latches 370 are shown in the unlocked position, the electronic card 900 may be inserted into the receiving groove 330, or the electronic card 900 may be taken from the insulating housing 300. In this case, the reinforcing member 200 may be wrapped in a corresponding latch 370 and disposed in a corresponding tower portion 320. Therefore, it may be possible to ensure that the reinforcing member 200 to not be contaminated by external dust and other dirt, and not be oxidized, etc., thereby ensuring the structural strength of the reinforcing member 200 and better protecting the insulating housing 300. The latches 370 may be molded from insulating materials such as plastic by a mold process. The latches 370 may be integral members. The latches 370 and the insulating housing 300 may be made of the same or different materials.

To reduce the risk that the electronic card 900 inserted into the receiving groove 330 moves relative to the insulating housing 300 during the use process, referring to FIGS. 4-5, a side wall 380 of the receiving groove 330 may be provided with one or more members 500. The side wall 380 may include a first side wall 381 and a second side wall 382 on opposite sides of the receiving groove 330. The first side wall 381 and the second side wall 382 may be spaced from each other in the transverse direction Y-Y, and the receiving groove 330 may be formed between the first side wall 381 and the second side wall 382. As shown in FIG. 5, the members 500 may be disposed such that the members 500 at least partially overlap with the reinforcing member 200 in the vertical direction Z-Z. Both the first side wall 381 and the second side wall 382 may be provided with the members 500. The two members 500 may face each other, or may be staggered by a certain spacing in the longitudinal direction X-X. The two members 500 may be of the same structure, and may be disposed in mirror images of each other. In unillustrated other embodiments, the member 500 may be disposed on only any one of the first side wall 381 and the second side wall 382.

In embodiments shown in the figure, since the receiving groove 330 extends into the tower portion 320, the side wall 380 of the receiving groove 330 extends into the tower portion 320 from the side portion 310. As shown in FIG. 4, the vertical height of a part of the side wall 380 on the side portion 310 may be smaller than that of a part of the side wall 380 on the tower portion 320. Exemplarily, the member 500 may be disposed on the part of the side wall 380 on the side portion 310. Exemplarily, the member 500 may be disposed on the part of the side wall 380 on the tower portion 320. Exemplarily, the members 500 may be disposed on the part of the side wall 380 on the side portion 310 and the part of the side wall 380 on the tower portion 320, respectively.

There may be no conductive element 110 on the side walls, inside the tower portion 320, of both sides of the receiving groove 330, and the conductive element 110 may provide a clamping and fixing function on the electronic card 900. The vertical height of the tower portion 320 may be larger than that of the side portion 310. Due to the limitation of machining accuracy, the transverse width of the receiving groove 330 in the tower portion 320 may be slightly larger than that of the electronic card 900, therefore, there may be a spacing between the electronic card 900 and the tower portion 320, resulting in movements of the electronic card 900 relative to the tower portion 320, and thus preferably, the tower portion 320 may be provided with the member 500.

The member 500 may be molded from materials such as a metal material by a mold process. The member 500 may be an integral member. Referring to FIGS. 5 and 12-14, the member 500 may include a beam 510. The beam 510 may extend into the receiving groove 330. The beam 510 may be used to apply an elastic force to the electronic card 900 inserted into the receiving groove 330. The beam 510 may be configured to be sufficiently stiff to provide mechanical support to a component such as the electronic card 900 inserted into the receiving groove 330. In some embodiments, the beam 510 may have a spring constant that is greater than that of the conductive elements 110. The member 500 may be electrically floating (i.e. not connected to a specific signal level) or isolated from electrically conductive structures of the electronic card 900.

Figure 3B:
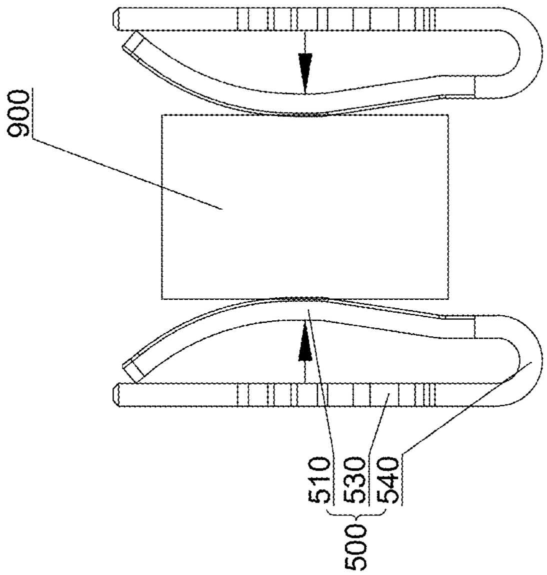
FIGS. 3A-3B are schematic diagrams illustrating interaction between a pair of members of the electrical connector of FIG. 1 and a mating electrical component, according to some embodiments.
Figure 3A:
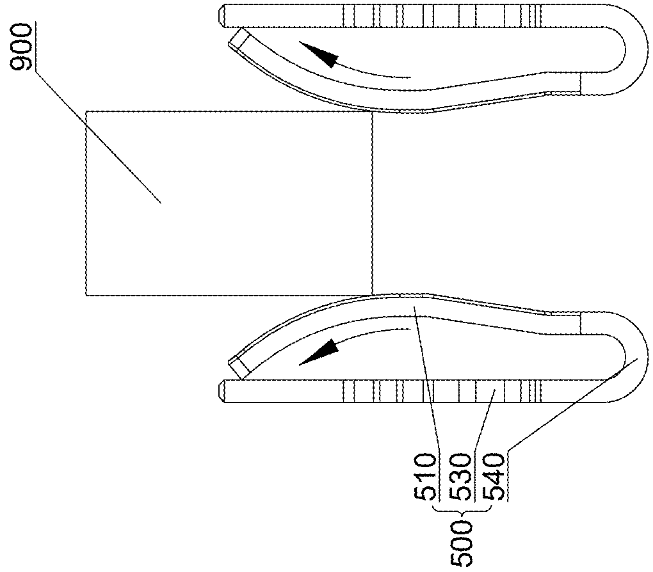

As illustrated in FIGS. 3A-3B, when the electronic card 900 moves into the receiving groove 330, the electronic card 900 may gradually approach the beam 510. When the electronic card 900 is inserted into the receiving groove 330, the beams 510 of the two members 500 may apply opposite elastic forces to the electronic card 900 inserted into the receiving groove 330. Such that the beam 510 may clamp the electronic card 900, thereby securing the electronic card 900 in the receiving groove 330. The beam 510 may press against an insulative surface portion of the electronic card 900. In the case that the member 500 may be disposed on only one side wall, the beam 510 may apply the elastic force to the electronic card 900 only in one direction.

In the electrical connector 100 of the embodiment of the present disclosure, the member 500 may be disposed on the side wall 380 of the receiving groove 330, such that when the mating electrical component is inserted into the receiving groove 330, the beam 510 may clamp the mating electrical component in a lateral direction (for example, the transverse direction Y-Y shown in the figure). In this way, the mating electrical component may be tightly connected to the insulating housing 300 through the member 500, and the mating electrical component may not move relative to the insulating housing 300 even if there is a spacing between the mating electrical component and the side wall 380 of the receiving groove 330 because of, e.g., a machining tolerance, therefore, the connection stability may be higher, and thus the mating electrical component retained in the receiving groove 330 has good electrical performance. The spacings between a thinner mating electrical component and the side walls 380 therefore may be larger than that between a thicker mating electrical component and the side walls 380. The members 500 may be configured to secure mating electrical components with various sizes in the receiving groove 330 and therefore enable the connector to be compatible with mating electrical components with various sizes. In addition, the member 500 may further play a role of a support beam, such that the mechanical strength of the insulating housing 300 may be improved, and the insulating housing 300 may be more solid and durable.

Although in the embodiment above, the member 500 and the reinforcing member 200 are used in the tower portion 320 in combination, in unillustrated other embodiments, the member 500 may also be used independently, instead of being used with the reinforcing member 200 together. Alternatively or additionally, member 500 may be inserted in the connector housing at a location bounding the slot that is outside the tower. For example, the member 500 may also be disposed inside the side portion 310, and the reinforcing member 200 may be disposed inside the tower portion 320. When the member 500 is used in the tower portion 320 in combination with the reinforcing member 200, a better effect may be achieved. The reason may be that: the tower portion 320 has a larger vertical height, and the electronic card 900 may be more prone to move relative to the tower portion 320. Therefore, improving the structural strength and clamping performance of the tower portion 320 may be beneficial to ensure the reliability of the connection between the electronic card 900 and the electrical connector 100, and prevent the electronic card 900 from moving relative to the electrical connector 100 during use. In addition, in the case that the reinforcing member 200 may be provided in the tower portion 320, the structure in the tower portion 320 may be more compact when independent members 500 are respectively disposed on side walls of both sides of the receiving groove 330.

When the electronic card 900 may be inserted into the receiving groove 330, the electronic card 900 may apply a reaction force to the member 500, and the member 500 may be forced to apply pressure to the insulating housing 300 towards the outer side of the receiving groove 330. The reinforcing member 200 may be positioned on the outer side of the member 500 relative to the receiving groove 330, which may improve the mechanical strength of a part of the insulating housing 300 on the outer side of the member 500. In this way, the reinforcing member 200 may be capable of shielding the pressure of the member 500 to the insulating housing 300.

As shown in FIG. 5, the cross section of the reinforcing member 200 perpendicular to the vertical direction may be U shaped. At least part of the member 500 may be positioned in the opening of the U shape. Optionally, the member 500 may be completely positioned inside the opening of the reinforcing member 200, to enable the reinforcing member 200 surround the member 500. The U-shaped reinforcing member 200 may be configured to counteract the pressure applied by the member 500 to the insulating housing 300 towards the outer side of the receiving groove 330. In the case that the member 500 is disposed, the mechanical strength of the tower portion 320 may be enhanced. In the case that each of two side walls 381 and 382 of the receiving groove 330 may be provided with the member 500, the reinforcing member 200 may surround the two members 500, as shown in FIG. 5. Optionally, a part of each member 500 may extend beyond the U-shaped reinforcing member 200.

The beam 510 may be elastic. In the embodiment shown in the figure, a beam first end 511 of the beam 510 may be connected to a base portion 530. A beam second end 512 opposite to the beam first end 511 takes the shape of a cantilever. In this way, the beam second end 512 of the beam 510 may have certain elasticity, thereby forming the elastic beam. In other embodiments, the beam 510 may be made of an elastic material, or have multiple modes such as have a thinner wall thickness, etc., so that the beam 510 takes the shape of the clastic beam. Referring to FIGS. 3A-3B, with this arrangement, when the electronic card 900 moves to the receiving groove 330, the electronic card 900 may abut against the beam 510, to curve the beams 510 away from each other, as indicated by arrows in FIG. 3A. When the electronic card 900 may be inserted into the receiving groove 330, the beam 510 may tightly clamp the electronic card 900, as indicated by arrows in FIG. 3B. Therefore, with this arrangement, the beam 510 may have a higher strength for clamping the electronic card 900, so that the electronic card 900 may be more tightly connected to the insulating housing 300 through the member 500, the electronic card 900 may not shake, and the electrical connector 100 may have more stable mechanical performance (for example, impact resistance) and electrical performance. In addition, regardless of the width of the electronic card 900, the electronic card 900 may be tightly clamped due to the elastic property of the beam 510. Therefore, the requirement on machining accuracy of the electronic card 900 may be reduced, so that the electrical connector 100 may be more widely used.

Figure 12:
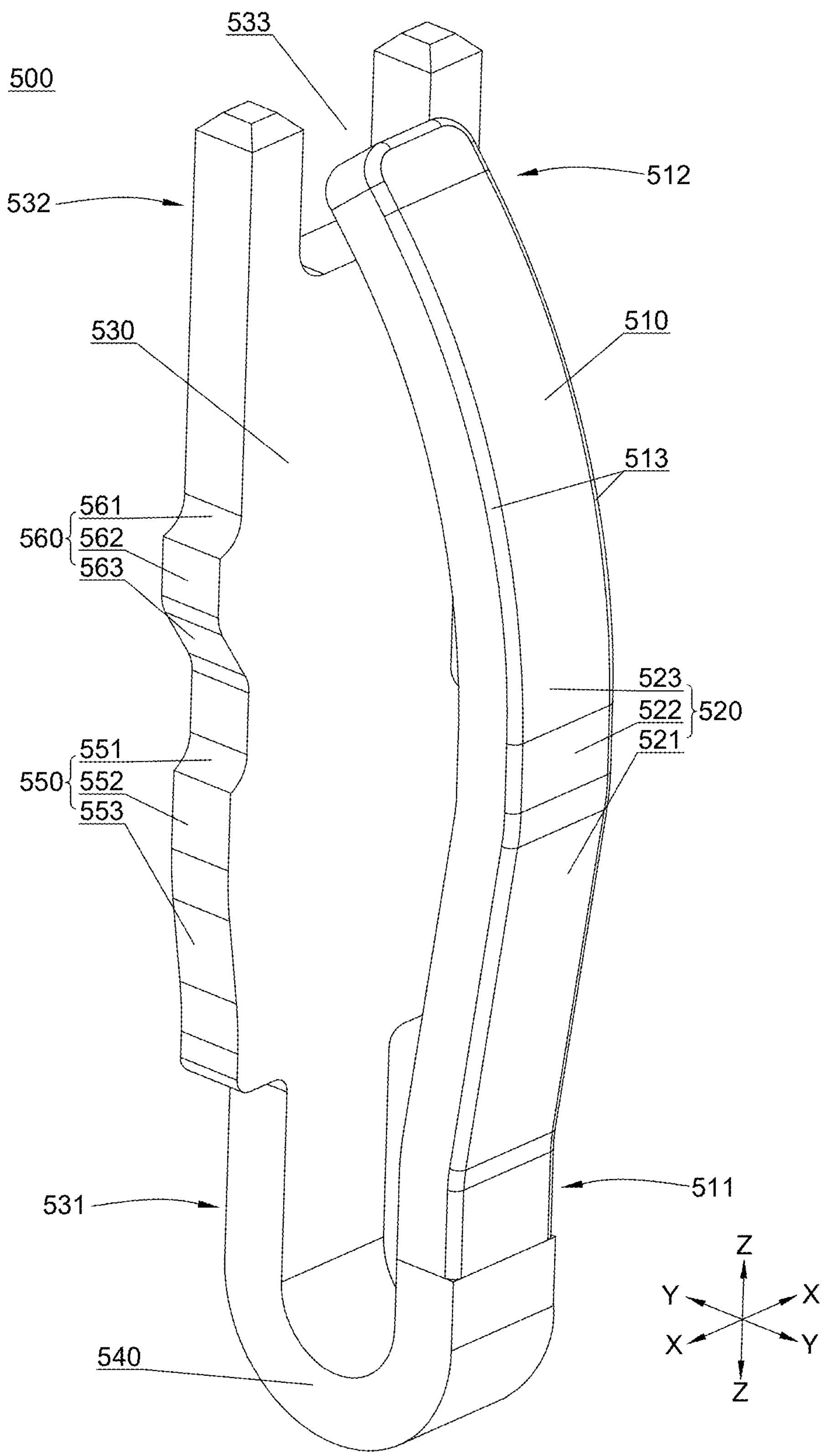
FIG. 12 is a perspective view of a member of the electrical connector of FIG. 4, according to some embodiments.
Figure 13:
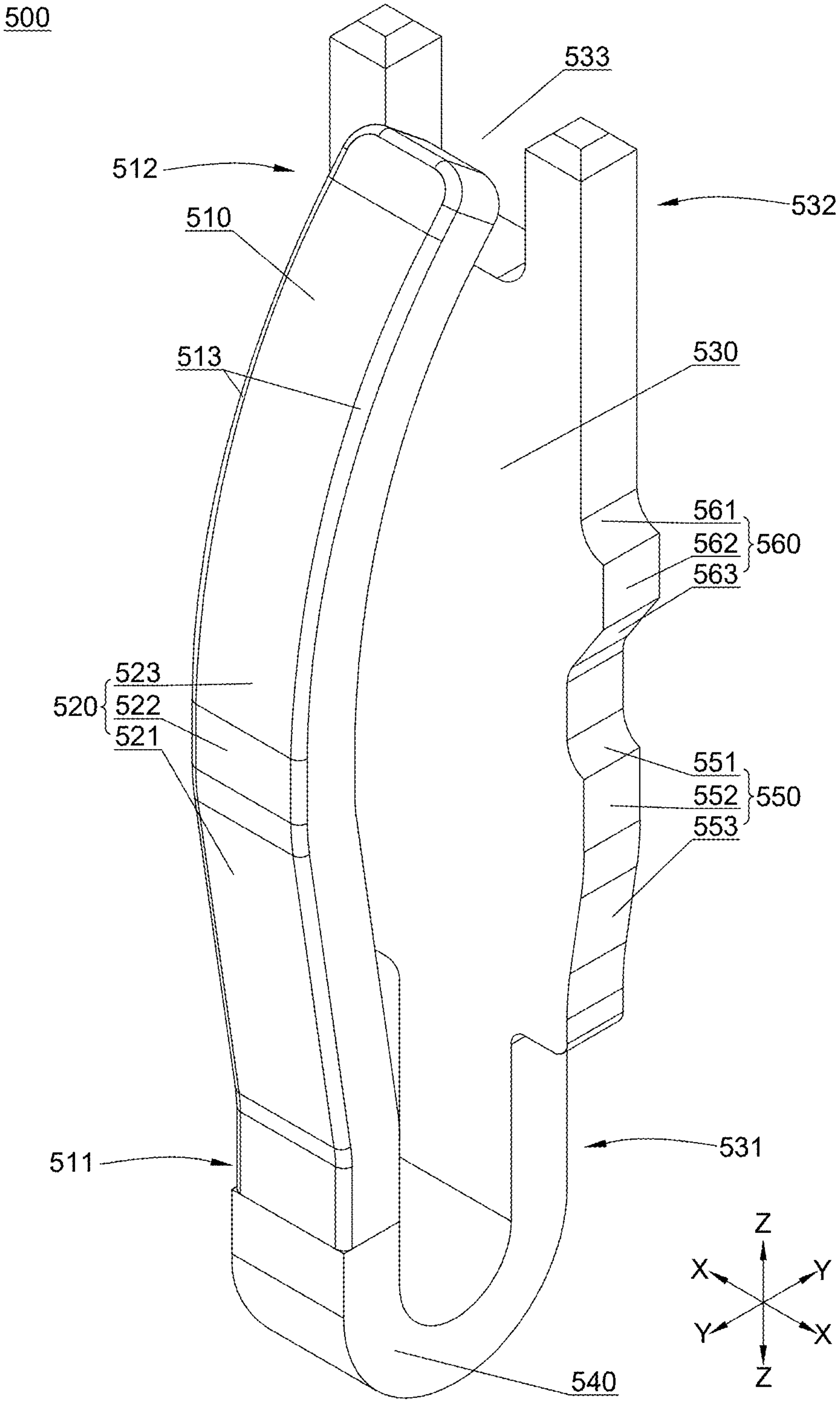
FIG. 13 is another perspective view of the member shown in FIG. 12.
Figure 14:
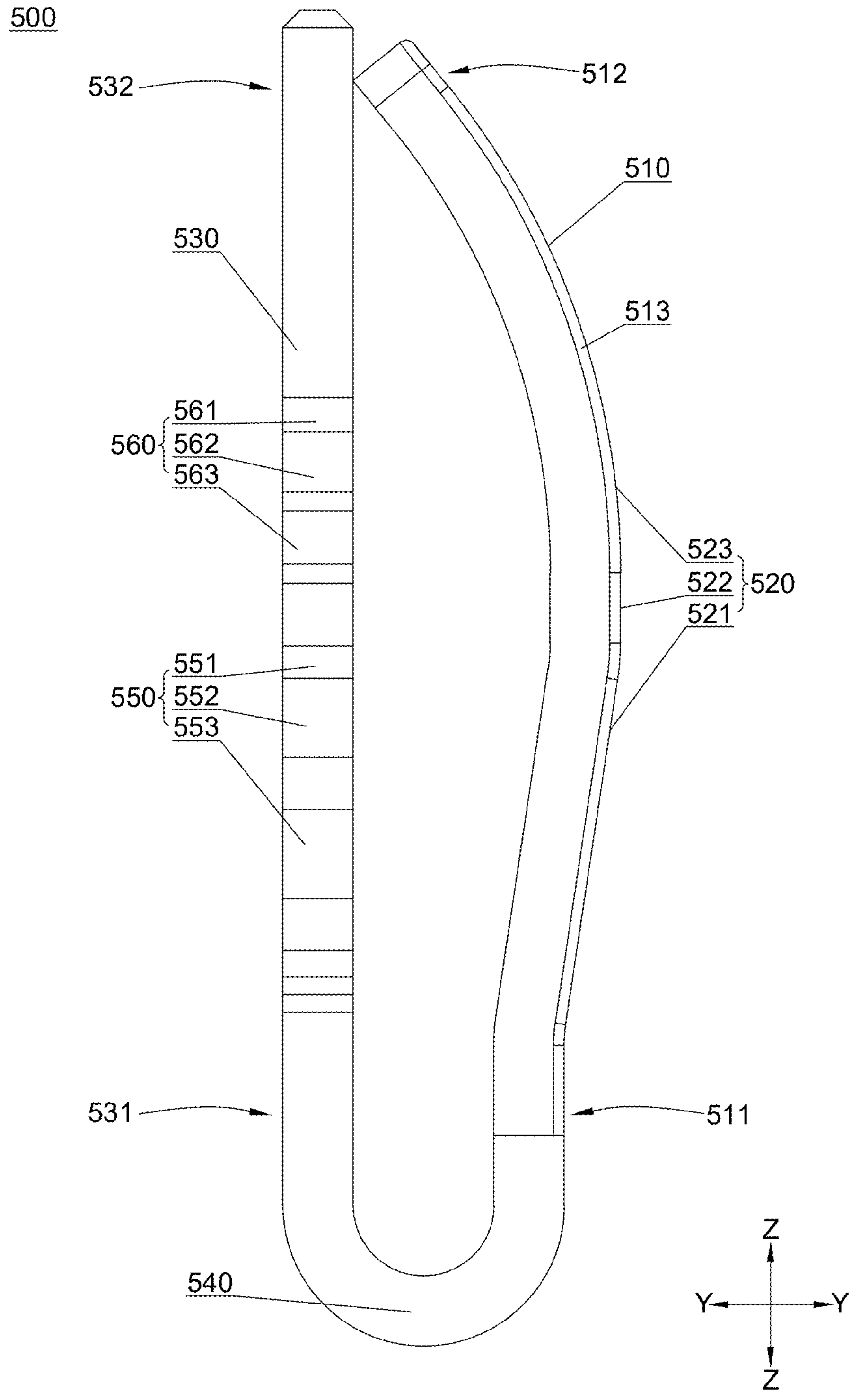
FIG. 14 is a side view of the member shown in FIG. 12.

As shown in FIGS. 12-14, the beam 510 may include a curved portion 520. The curved portion 520 may be positioned in the middle of the beam 510. The curved portion 520 may be positioned between the first end 511 and the second end 512. The curved portion 520 may be curved inwards the receiving groove 330. In other words, the curved portion 520 may protrude inwards the receiving groove 330. The curved portion 520 may extend into the receiving groove 330 and configured to apply an elastic force to the electronic card 900 inserted into the receiving groove 330. In this way, when the electronic card 900 moves to the receiving groove 330, a friction force between the beam 510 and the electronic card 900 may be less, thereby reducing the wear of the two caused by friction, and prolonging the service life of the two.

As shown in FIGS. 12-14, the curved portion 520 may include a first subportion 521, a second subportion 522 and a third subportion 523. The first subportion 521 may extend into the receiving groove 330, and be connected to one end of the second subportion 522. The third subportion 523 may extend beyond the receiving groove 330 from the other end of the second subportion 522. In FIG. 14, the second subportion 522 may be positioned on the right sides of the first subportion 521 and the third subportion 523. Therefore, the first subportion 521 may obliquely extend towards the lower left side from the second subportion 522. The third subportion 523 may obliquely extend towards the upper left side from the second subportion 522. The second subportion 522 may protrude relative to the first subportion 521 and the third subportion 523. The second subportion 522 may protrude into the receiving groove 330. The second subportion 522 may abut against the electronic card 900 inserted into the receiving groove 330 and configured to apply an elastic force thereto. The second subportion 522 may be of any suitable structure, for example, a straight structure, or a curved structure. With this arrangement, the curved portion 520 may be concise in structure and low in manufacturing cost. The second subportion 522 may form surface contact with the electronic card 900 during use, thereby more firmly clamping the electronic card 900.

As shown in FIGS. 12-14, the edge of the beam 510 may has a rounded corner(s) 513. By setting the rounded corner 513, when the electronic card 900 moves into the receiving groove 330, a friction force between the beam 510 and the electronic card 900 may be less, thereby reducing the wear of the two caused by friction, and prolonging the service life of the two.

As shown in FIGS. 12-14, the member 500 may further include the base portion 530. The base portion 530 may be connected to the side wall 380 in an inserting manner. The clamping claw 510 may be connected to the base portion 530. The clamping claw 510 may be fixed to the side wall 380 of the receiving groove 330 through the base portion 530. In unillustrated other embodiments, the clamping claw 510 may also be fixed on the side wall 380 of the receiving groove 330 by modes such as welding, adhesion, connection with a fastener, integral molding and so on. In this way, the member 500 and the insulating housing 300 may be separately manufactured, and subsequently assembled together in an insertion connection mode, thereby reducing the machining difficulty.

The beam 510 may be spaced apart from the base portion 530 in the transverse direction Y-Y. The base portion 530 may be away from the receiving groove 330 relative to the beam 510. One end part of the beam 510 may be connected to the base portion 530 by a connecting portion 540. Exemplarily, the beam 510 may be provided with the first end 511 and the second end 512 which may be oppositely disposed. The first end 511 may be farther away from the mating surface 301 than the second end 512 (as shown in FIG. 4), and correspondingly, the second end 512 may be relatively closer to the mating surface 301. The base portion 530 may be provided with a first end 531 and a second end 532 which may be oppositely disposed. The first end 531 may be farther away from the mating surface 301 than the second end 532, and correspondingly, the second end 532 may be relatively closer to the mating surface 301. The first end 511 and the first end 531 may be connected by the connecting portion 540. With this arrangement, the member 500 may be firmly fixed on the side wall 380. In addition, the beam 510 may be elastic.

Figure 15A:
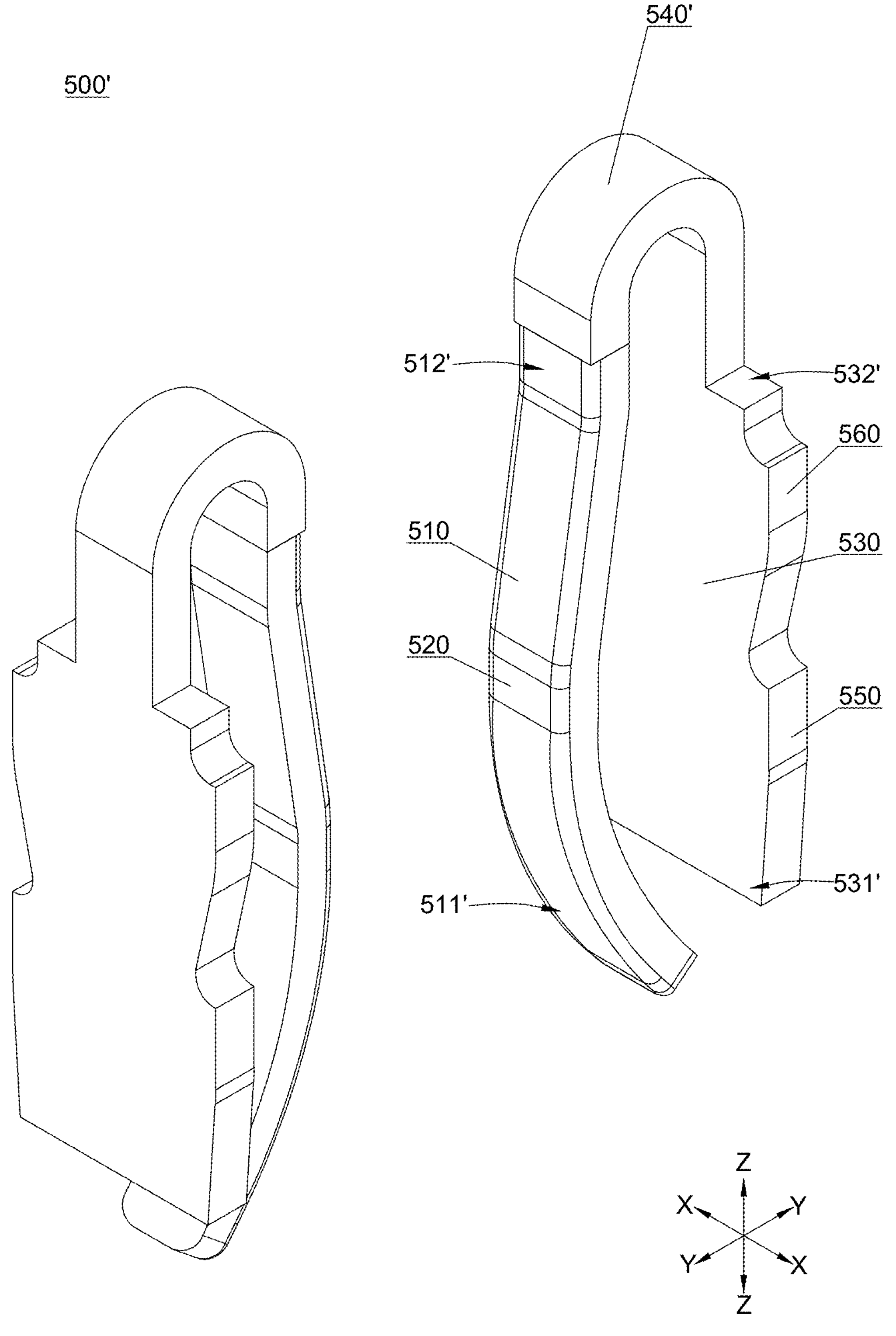
FIG. 15*a* is a perspective view of another embodiment of a pair of members of the electrical connector of FIG. 4.
Figure 15B:
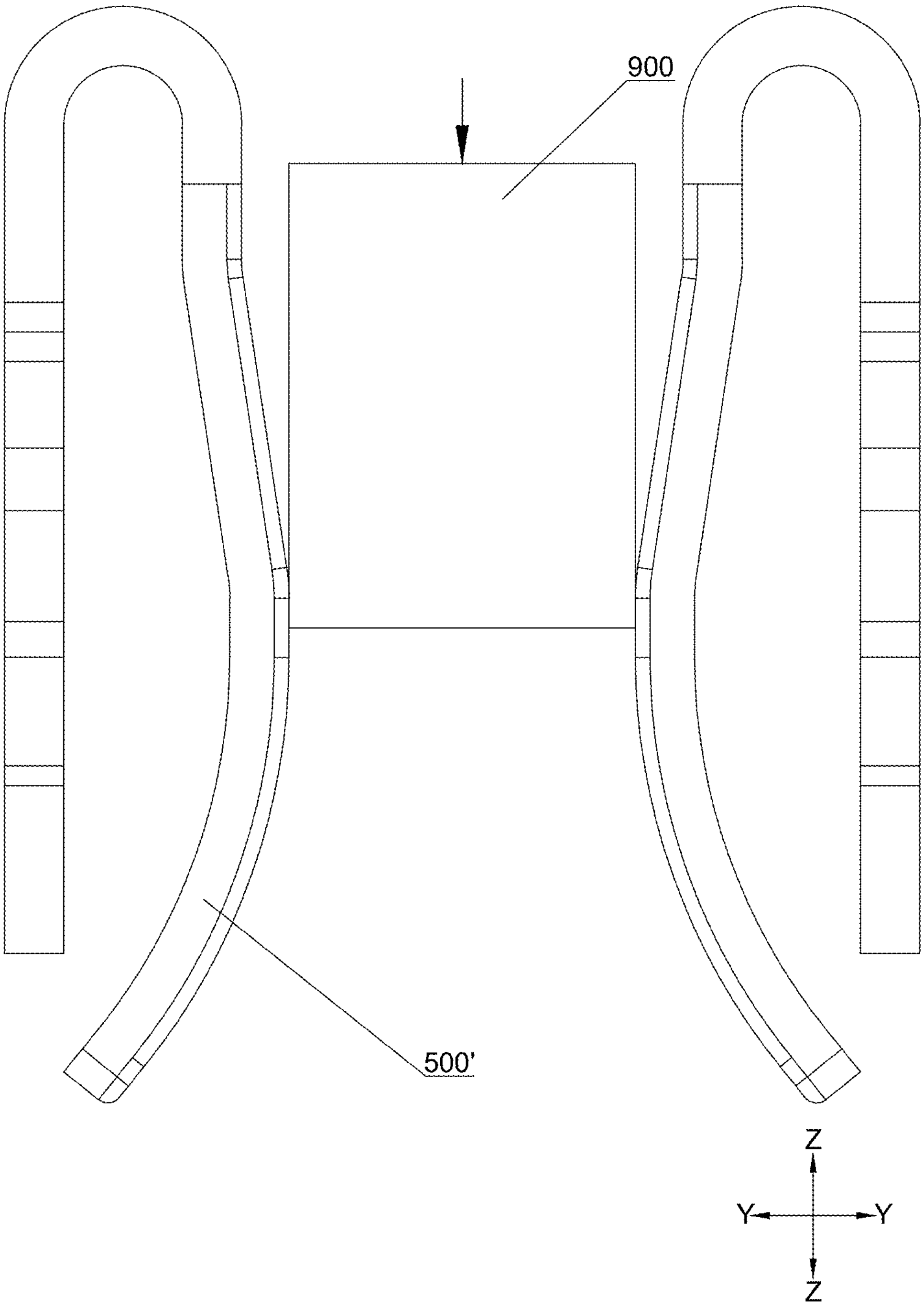
FIG. 15*b* is a schematic diagram illustrating interaction between the pair of members shown in FIG. 15*a* and a mating electrical component.

FIGS. 15*a*-15*b* show another embodiment of a member 500'.As illustrated, a connecting portion 540' may also connect a second end 512' of a beam and a second end 532' of a base portion. Exemplarily, in two embodiments shown in FIGS. 12-14 and FIGS. 15*a*-15*b* respectively, both the connecting portions 540 and 540' may be U-shaped. The difference mainly lies in that: in the embodiment shown in FIGS. 12-14, the opening of the U-shaped connecting portion 540 faces upwards, and exemplarily, the first end 511 and the first end 531 may be respectively connected to both ends of the U-shaped connecting portion 540; while in the embodiment shown in FIGS. 15*a*-15*b*, the opening of the U-shaped connecting portion 540' faces downwards, and exemplarily, the second end 512' and the second end 532' may be respectively connected to both ends of the U-shaped connecting portion 540'. The base portion 530 and the beam 510 may be connected through the U-shaped connecting portion, thereby providing a good elasticity for the beam 510, and more tightly connecting the member 500 with the electronic card 900.

What needs to be noted is that identical or similar parts of the embodiment shown in FIGS. 15*a*-15*b* and the embodiment shown in FIGS. 12-14 may be marked with identical figures, which are not described herein in detail for the purpose of conciseness.

As shown in FIGS. 12-14, the width in the longitudinal direction of the connecting portion 540 (that is, the size in the longitudinal direction X-X) may be smaller than that of the base portion 530. In this way, a step may be formed between the connecting portion 540 and the first end 531, which may be configured for the base portion 530 to abut against a platform 394 (which is described in detail below), and configured to fix the member 500.

As shown in FIGS. 12-14, the second end 532 of the base portion 530 may be provided with an opening 533. The second end 512 of the beam 510 may extend towards the opening 533. The second end 512 may extend into the opening 533 when the electronic card 900 is inserted into the receiving groove 330. By having the opening 533, the beam 510 has a larger space for elastic deformation, such that the beam 510 may have a better elastic effect, and the member 500 may be more tightly connected to the insulating housing 300.

As shown in FIGS. 15*a*-15*b*, to increase the activity space for the beam 510, an opening similar to the opening 533 may be formed in the first end 531' of the base portion 530. However, to simplify the structure and be convenient to process and manufacture, the first end 531', away from the mating surface 301 (as shown in FIG. 4), of the base portion 530 may be shorter than a first end 511', away from the mating surface 301, of the beam 510. Along a direction towards the mounting surface 302 (as shown in FIG. 4), the first end 511' may extend beyond the first end 531', that is, the first end 511' may be closer to the mounting surface 302 than the first end 531', and may be farther away from the mating surface 301. Therefore, when the electronic card 900 is inserted into the receiving groove 330, the first end 511' may extend below the first end 531', such that the beam 510 may have a larger space for elastic deformation, and the beam 510 may have better elasticity.

As shown in FIGS. 6-10, the side wall 380 may be provided with a mounting groove 391 and a beam groove 392. Both the mounting groove 391 and the beam groove 392 may extend inwards the insulating housing 300 from the mating surface 301. The beam groove 392 may be communicated, along the transverse direction Y-Y, between the mounting groove 391 and the receiving groove 330. That is, the receiving groove 330, the mounting groove 391 and the beam groove 392 may be connected with one another. The base portion 530 may be fixed in the mounting groove 391. The beam 510 may be moveably disposed in the beam groove 392. The width in the longitudinal direction of the beam 510 may be smaller than that of the beam groove 392, thereby achieving moveability. With this arrangement, the structure of the insulating housing 300 for fixing the member 500 may be concise, and low in manufacturing cost.

As shown in FIGS. 6-10, each of the side walls 380 may further be provided with an accommodating groove 393. The accommodating groove 393 may be recessed towards a direction away from the mating surface 301 (that is, a direction facing the mounting surface 302) from the mounting groove 391 and the beam groove 392. That is, the accommodating groove 393 may be positioned at the bottom of the mounting groove 391 and the beam groove 392, and may be connected with the mounting groove 391 and the beam groove 392. The connecting portion 540 may be accommodated inside the accommodating groove 393. The accommodating groove 393 may be narrower, in the longitudinal direction X-X, than the mounting groove 391, thereby forming the platform 394. The base portion 530 may abut against the platform 394. The platform 394 plays a role of a position limiter, and when the base portion 530 abuts against the platform 394, it may ensure that the member 500 may be mounted in place, and further ensure that the electrical connector 100 has stabler mechanical performance and electrical performance.

As shown in FIGS. 6-10, the width in the longitudinal direction of the lower part of the beam groove 392 may be smaller than that of the mounting groove 391. The lower part of the beam groove 392 may be connected to a middle part of the mounting groove 391 in the longitudinal direction X-X. In this way, when viewed in the vertical direction Z-Z, the mounting groove 391 and the beam groove 392 may be T-shaped. With this arrangement, the base portion 530 may be prevented from moving along the transverse direction Y-Y, thereby tightly connecting the member 500 with the insulating housing 300.

As shown in FIGS. 6-10, the width in the longitudinal direction of the upper part of the beam groove 392 may be larger than that of the lower part thereof. In this way, when the beam 510 is inserted into the beam groove 392, the upper part of the beam groove 392 may play a guiding role. Even if the beam 510 deviates in the moving process, since the upper part of the beam groove 392 has a larger width in the longitudinal direction and may play a role for guiding the beam 510, the deviated beam 510 may be corrected so as to be inserted into the beam groove 392.

As shown in FIGS. 6-10, the width in the longitudinal direction of the upper part of the beam groove 392 may be equivalent to that of the mounting groove 391. The upper part of the beam groove 392 may be aligned, in the longitudinal direction X-X, to the mounting groove 391. In the longitudinal direction X-X, two side walls of the upper part of the beam groove 392 may be disposed respectively on a same plane with two side walls of the mounting groove 391. In this way, the structure of the insulating housing 300 may be more concise and low in manufacturing cost.

Although it is not illustrated, it should be appreciated based on the description above that the member 500' shown in FIGS. 15*a*-15*b* may also be mounted through a mounting groove and a beam groove similar to the mounting groove 391 and the beam groove 392. Therefore, the description of the mounting groove 391 and the beam groove 392 herein may also be used for the embodiment shown in FIGS. 15*a*-15*b*. What needs to be noted is that since the connecting portion 540' may be disposed closer to the mating surface 301 (as shown in FIG. 4) in the embodiment shown in FIGS. 15*a*-15*b*, the accommodating groove 393 described above may not need to be disposed.

To firmly connect the base portion 530 with the mounting groove 391, both the base portion 530 shown in FIGS. 15*a*-15*b* and the base portion 530 shown in FIGS. 12-14 may be provided with a first abutting protrusion 550 and/or a second abutting protrusion 560. The first abutting protrusion 550 and the second abutting protrusion 560 are described below with reference to FIGS. 12-14. One or both of two opposite side surfaces, in the longitudinal direction X-X, of the base portion 530 may be provided with the first abutting protrusion 550. The first abutting protrusion 550 may abut against the side wall of the mounting groove 391. By having the first abutting protrusion 550, material consumption of the member 500 may be reduced, and then the cost of the electrical connector 100 may be reduced. In addition, the abutting area of the base portion 530 and the mounting groove 391 may be reduced, thereby reducing friction in the mounting process, and being convenient in mounting. Moreover, the possibility that abutting surfaces does not fit because of uneven surfaces may further be reduced, so that the requirement on machining accuracy may be reduced.

As shown in FIGS. 12-14, the first abutting protrusion 550 may include a surface 551, a surface 552 and a surface 553. The surface 551, the surface 552 and the surface 553 may enclose and form the first abutting protrusion 550. The surface 551 may face the mating surface 301 (as shown in FIG. 4), the surface 553 may face away from the mating surface 301, and the surface 552 may connect the surface 551 and the surface 553. The surface 553 may be inclined, along a direction facing the mating surface 301, towards the outer side of the base portion 530. In this way, when the base portion 530 is inserted into the mounting groove 391, the first abutting protrusion 550 may play a guiding role, the deviated base portion 530 may be corrected so as to be inserted into the mounting groove 391.

As shown in FIGS. 12-14, a side surface of the base portion 530 provided with the first abutting protrusion 550 may further be provided with the second abutting protrusion 560. The second abutting protrusion 560 may abut against the side wall of the mounting groove 391. Along the vertical direction Z-Z, the second abutting protrusion 560 and the first abutting protrusion 550 may be spaced apart. The second abutting protrusion 560 may be closer to the mating surface 301 (as shown in FIG. 4) than the first abutting protrusion 550. The second abutting protrusion 560 may protrude farther than the first abutting protrusion 550. That is, the width in the longitudinal direction of the second abutting protrusion 560 may be larger than that of the first abutting protrusion 550. By having the second abutting protrusion 560, the connection strength of the base portion 530 and the mounting groove 391 may be further improved. Referring to FIGS. 4-5, when the base portion 530 is inserted into the mounting groove 391, compared with the second abutting protrusion 560, the first abutting protrusion 550 may have a longer stroke in the base portion 530. By appropriately reducing protruding amount of the first abutting protrusion 550, the friction between the base portion 530 and the mounting groove 391 may be reduced, thereby being convenient in mounting. Meanwhile, since the insulating housing 300 may be made of a plastic, and the member 500 may be made of a metal, when the base portion 530 is inserted into the mounting groove 391, the first abutting protrusion 550 may abut against the side wall of the mounting groove 391, such that the side wall of the mounting groove 391 may be recessed outwards, the width in the longitudinal direction of the mounting groove 391 may be appropriately expanded, thereby providing a space for the second abutting protrusion 560 to move in the mounting groove 391, further reducing the friction between the base portion 530 and the mounting groove 391, and being convenient in mounting.

As shown in FIGS. 12-14, the second abutting protrusion 560 may include a surface 561, a surface 562 and a surface 563. The surface 561, the surface 562 and the surface 563 may enclose and form the second abutting protrusion 560. The surface 561 may face the mating surface 301 (as shown in FIG. 4), the surface 563 may face away from the mating surface 301, and the surface 562 may be connected between the surface 561 and the surface 563. The surface 563 may be inclined, along a direction facing the mating surface 301, towards the outer side of the base portion 530. In this way, when the base portion 530 is inserted into the mounting groove 391, the second abutting protrusion 560 may play a guiding role, the deviated base portion 530 may be corrected so as to be inserted into the mounting groove 391.

FIGS. 16*a*-16*b* and FIGS. 17*a*-17*b* show further alternative embodiments of member 500" member 500'" respectively. A beam 510" and a base portion 530" may be sequentially disposed in the vertical direction Z-Z, and one end part of the beam 510" may be connected to the base portion 530". In the above embodiments, the beam and the base portion may be spaced apart in the transverse direction to form a "left-right structure". In the member 500" and the member 500", the beam 510" and the base portion 530" may be sequentially connected in the vertical direction Z-Z to form a "lower-upper structure" shown in the figures. One end part of the beam 510" may be directly connected to the base portion 530". The difference between the member 500" and the member 500'" lies in that a second end 512" of the beam 510" of the member 500" may be connected to the base portion 530"; and a first end 511" of the beam 510" of the member 500'" may be connected to the base portion 530". Such a structure may take a smaller space in the transverse direction Y-Y, so that the beam 510" may have a larger curve degree, thereby having higher elasticity. The middle portion of the beam 510" may curve inwards the receiving groove so as to curve towards the electronic card 900, thereby forming a curved portion 510" and configured to apply an elastic force to the electronic card 900.

Figure 16A:
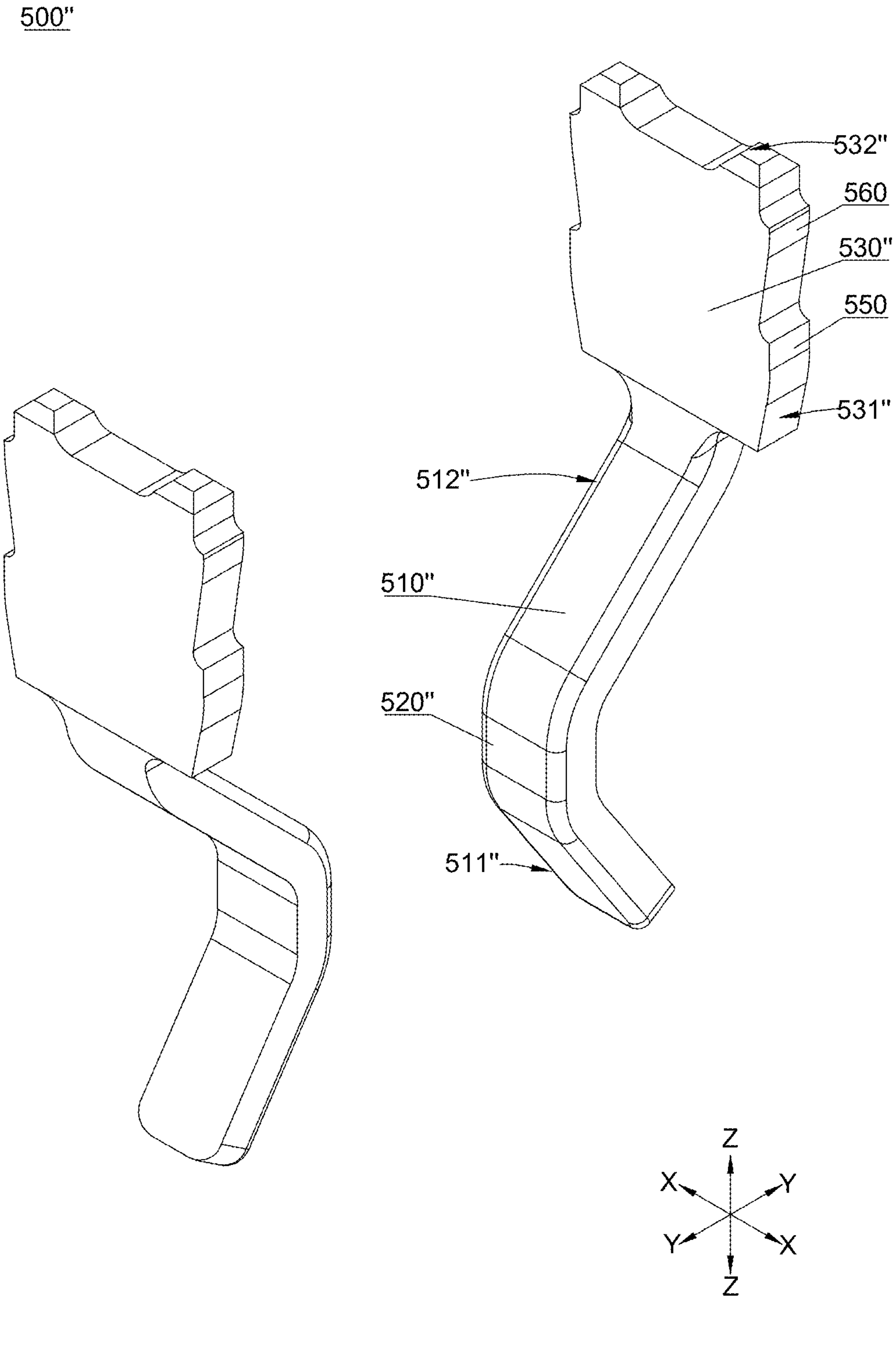
FIG. 16*a* is a perspective view of another embodiment of a pair of members of the electrical connector of FIG. 4.
Figure 16B:
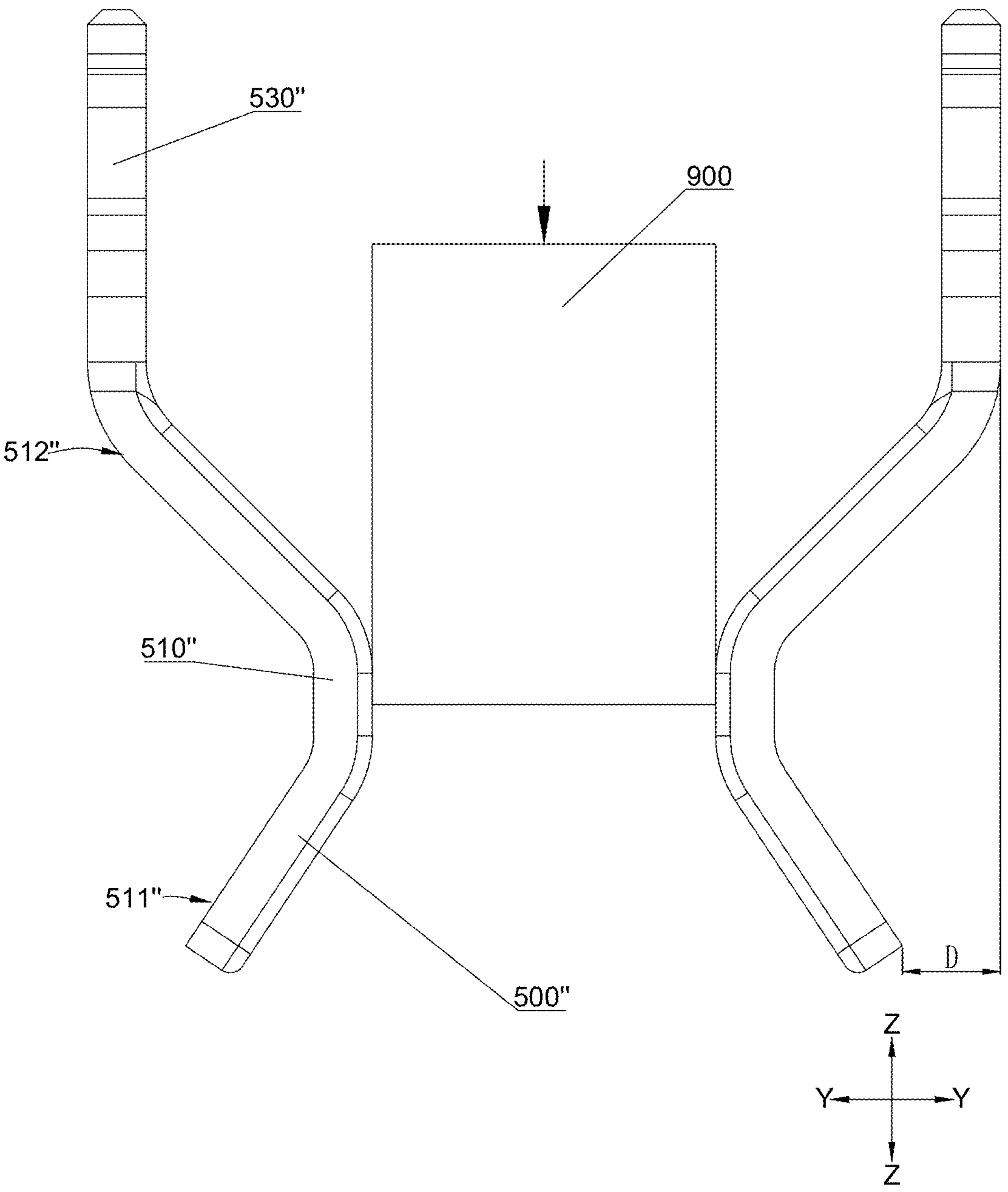
FIG. 16*b* is a schematic diagram illustrating interaction between the pair of members shown in FIG. 16*a* and a mating electrical component.

The beam 510", in addition to being connected to the end part of the base portion 530", may be further provided with the other end part, and in the member 500" shown in FIGS. 16*a*-16*b*, the other end part may be the first end 511". In the transverse direction Y-Y, the first end 511" may be shorter than the second end 512", such that the first end 511" may be spaced apart from the base portion 530" in the transverse direction Y-Y, for example, spaced in a distance D. In this way, the first end 511" as a free end may move in a larger space.

Figure 17A:
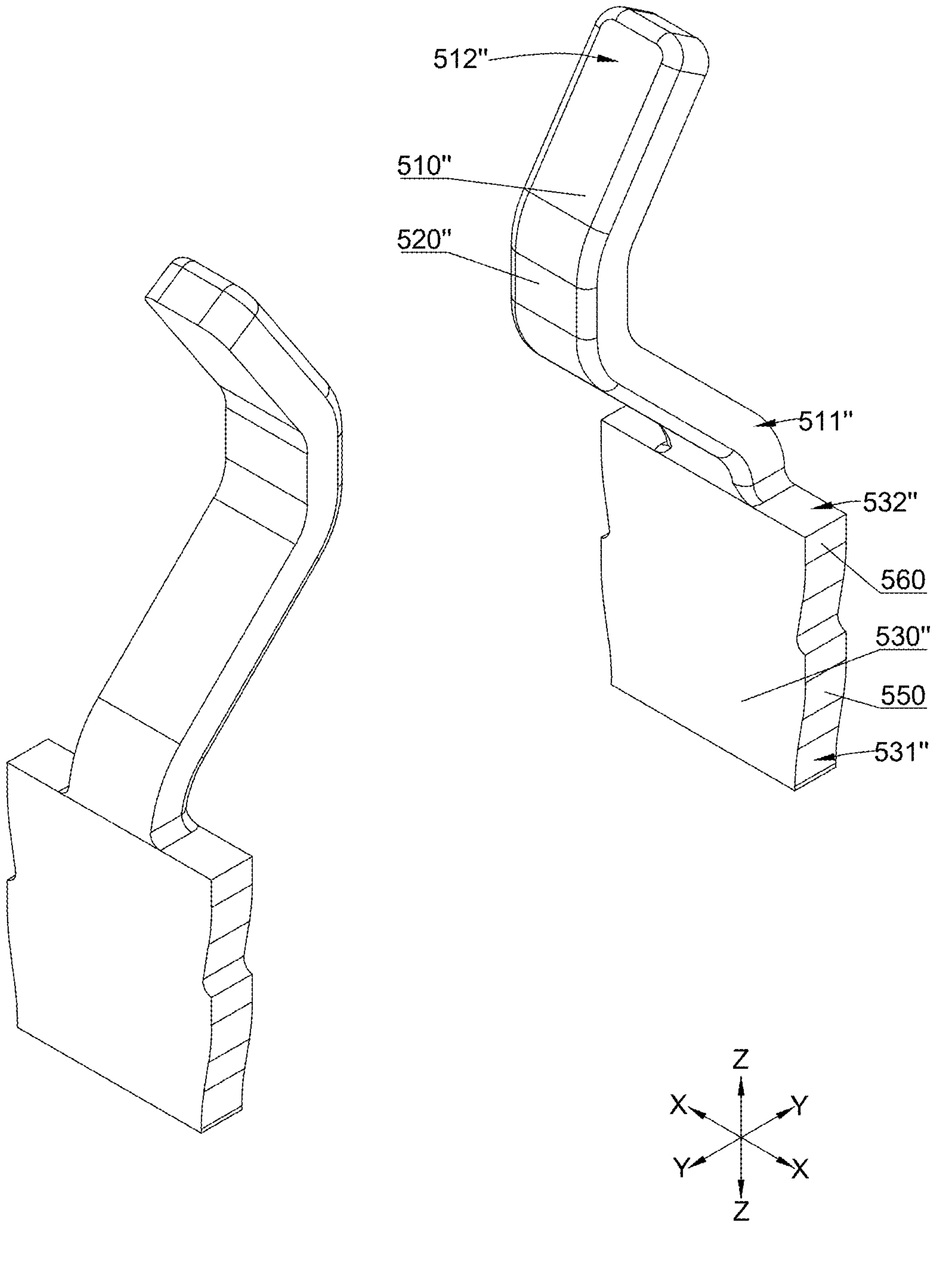
FIG. 17*a* is a perspective view of another embodiment of a pair of members of the electrical connector of FIG. 4.
Figure 17B:
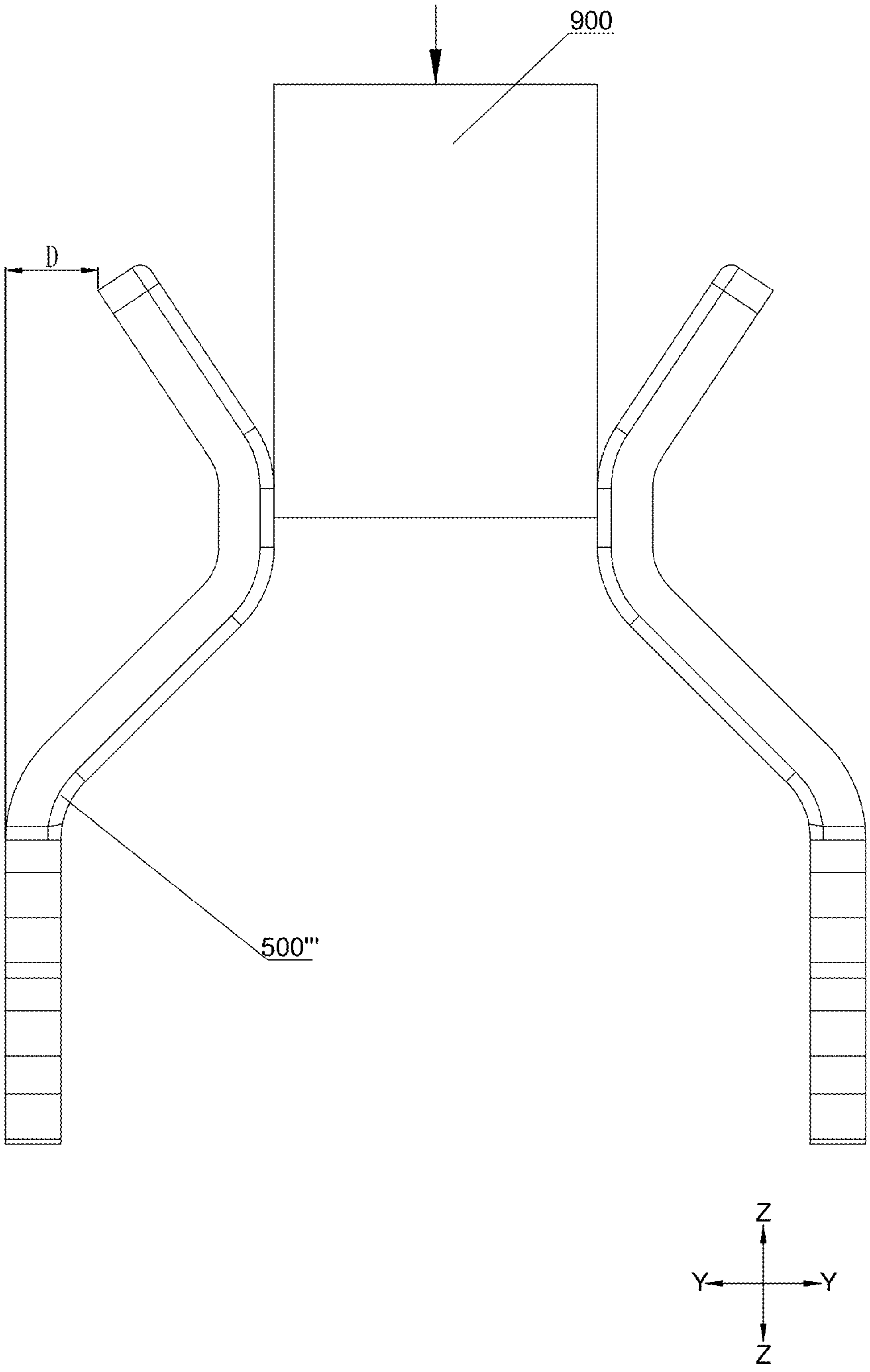
FIG. 17*b* is a schematic diagram illustrating interaction between the pair of members shown in FIG. 17*a* and a mating electrical component.

As shown in the member 500'" shown in FIGS. 17*a*-17*b*, in the transverse direction Y-Y, the beam second end 512" may be shorter than the first end 511", such that the second end 512" may be spaced apart from the base portion 530" in the transverse direction Y-Y. In this way, the second end 512" as a free end may have a larger activity space.

As shown in FIGS. 16*a*-17*b*, the width in the longitudinal direction of the beam 510" may be smaller than that of the base portion 530". The base portion 530" may have a larger width in the longitudinal direction, which may be configured to mount the base portion 530" in the side wall of the receiving groove. The beam 510" may have a smaller width in the longitudinal direction, which may reduce the size of a beam groove, for accommodating the beam 510", in the side wall, such that the mechanical strength of the insulating housing 300 may be improved.

To hold the member 500" or the member 500", the side wall of the receiving groove 330 may be provided with corresponding mounting groove and beam groove. Both the mounting groove and the beam groove may extend inwards the insulating housing from the mating surface. The beam groove may be positioned, in the transverse direction, between the mounting groove and the receiving groove. The base portion may be fixed inside the mounting groove, and the beam may be moveably disposed in the beam groove. For the member 500", the mounting groove may only extend for a shorter distance from the mating surface, while the beam groove may extend for a longer distance. To provide a sufficient activity space for the first end 511", the beam groove may extend to be closer to the first end 511", such that the first end 511" may move into the beam groove when the beam 510" applies an elastic force to the electronic card 900. For the member 500", the mounting groove may extend for a longer distance from the mating surface, while the beam groove may extend for a shorter distance. When the beam 510" applies an elastic force to the electronic card 900, the second end 512" may move into the mounting groove.

To securely hold the base portion 530" in the mounting groove, the base portion 530" of the member 500" may be provided with the first abutting protrusion 550 and/or the second abutting protrusion 560 described above. Similarly, the base portion 530" of the member 500" may also be provided with the first abutting protrusion 550 and/or the second abutting protrusion 560 described above. The first abutting protrusion 550 and the second abutting protrusion 560 may refer to the description in corresponding parts above, and are no longer described in detail for the purpose of conciseness.

The present disclosure has been described through the above embodiments, but it should be understood that a variety of variations, modifications and improvements may be made by a person skilled in the art according to the teaching of the present disclosure, and these variations, modifications and improvements fall within the spirit of the present disclosure and the claimed scope of protection of the present disclosure. The scope of protection of the present disclosure is defined by the appended claims and its equivalent scope. The above embodiments are for the purpose of illustration and description, and may not intend to limit the present disclosure to the scope of the described embodiments.

Various variations may be made to the structures illustrated and described herein. For example, the member described above are used in card edge connectors, but the member may also be used in any suitable electrical connectors, such as backplane connectors, daughter card connectors, stacking connectors, Mezzanine connectors, I/O connectors, chip sockets, Gen Z connectors, etc. When these connectors are in use, they may encounter the problem of insufficient stability, and the member may improve the stability of the connection between the mating electrical component and such connectors.

Moreover, although many creative aspects have been described above with reference to the vertical connector, it should be understood that the aspects of the present disclosure may not be limited to these. Any one of the creative features, whether alone or combined with one or more other creative features, may also be used for other types of electrical connectors, such as right-angle connectors and coplanar connectors, and the like.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like may be shown based on the accompanying drawings for the purposes of the case in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" may refer to the inside and outside relative to the contour of each component itself.

For facilitating description, the spatial relative terms such as "on", "above", "on an upper surface of" and "upper" may be used herein to describe a spatial position relationship between one or more components or features and other components or features shown in the accompanying drawings. It should be understood that the spatial relative terms may include the orientations of the components shown in the accompanying drawings and different orientations in use or operation. For example, if the component in the accompanying drawings is turned upside down, the component "above other components or features" or "on other components or features" will include the case where the component is "below other components or features" or "under other components or features". Thus, the exemplary term "above" may encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way may be interchanged as appropriate, so that the embodiments of the present disclosure described herein may be implemented in a sequence other than those illustrated or described herein.

What is claimed is:

1. An electrical connector comprising:

a housing comprising a slot comprising a first portion and a second portion, a pair of side portions each elongating in a longitudinal direction and at least partially separated by the first portion of the slot, and a tower portion extending in a vertical direction perpendicular to the longitudinal direction and comprising the second portion of the slot;

a member disposed in the tower portion of the housing, the member comprising a beam curving into the second portion of the slot; and a reinforcing member disposed in the tower portion of the housing and having a U-shaped cross-section perpendicular to the vertical direction so as to at least partially enclose the second portion of the slot, wherein the member is positioned between the second portion of the slot and the reinforcing member.

2. The electrical connector of claim 1, wherein:

the member is electrically floating.

3. The electrical connector of claim 1, wherein:

the member comprises a base portion fixedly disposed in the tower portion; and the beam joins the base portion.

4. The electrical connector of claim 1, comprising:

a plurality of conductive elements held in the pair of side portions of the housing, the plurality of conductive elements comprising portions curving into the first portion of the slot.

5. The electrical connector of claim 4, wherein:

the beam of the member is elastic, and the beam of the member is configured to be less elastic than the plurality of conductive elements.

6. The electrical connector of claim 4, wherein:

the member has a spring constant that is greater than that of the plurality of conductive elements.

7. The electrical connector of claim 3, wherein:

the beam of the member has a first width in the longitudinal direction; and the base portion of the member has a second width in the longitudinal direction that is greater than the first width of the beam of the member.

8. The electrical connector of claim 1, wherein:

the reinforcing member at least partially overlaps the member in the longitudinal direction.

9. The electrical connector of claim 1, wherein:

the member is a first member;

the electrical connector comprises a second member configured similar to the first member; and the second member comprises a beam curving into the second portion of the slot and opposing the beam of the first member.

10. An electrical connector comprising:

a housing comprising a pair of side portions each elongating in a longitudinal direction, a portion extending in a vertical direction perpendicular to the longitudinal direction, and a slot at least partially separating the pair of side portions; and a member comprising a first portion fixed to the housing adjacent the portion of the housing extending in the vertical direction and a compliant portion extending into the slot, wherein:

the portion of the housing comprises a first insertion space for the member, and a second insertion space at least partially surrounding an end of the slot and separated from the first insertion space in a transverse direction perpendicular to both the longitudinal direction and the vertical direction, the second insertion space configured for receiving a reinforcing member.

11. The electrical connector of claim 10, wherein:

the first insertion space of the housing comprises a first groove and a second groove connected to the first groove;

the second groove is disposed between the slot and the first groove; and the first portion of the member is fixedly disposed in the first groove of the portion of the housing and the compliant portion of the member is movably disposed in the second groove of the portion of the housing.

12. The electrical connector of claim 11, wherein:

the first groove of the portion of the housing has a first width in the longitudinal direction; and the second groove of the portion of the housing has a second width in the longitudinal direction that is less than the first width of the first groove.

13. The electrical connector of claim 11, further comprising:

a latch comprising bearing surfaces engaging complementary bearing surfaces of the portion of the housing, wherein:

the first groove and second groove of the portion of the housing are disposed closer to a mating surface than the complementary bearing surfaces of the portion of the housing.

14. The electrical connector of claim 11, wherein:

the member further comprises a connecting portion joining the first portion and the compliant portion;

the connecting portion of the member is U-shaped; and the compliant portion and the first portion are connected to opposite ends of the U-shaped connecting portion.

15. The electrical connector of claim 14, wherein:

the connecting portion has a width in the longitudinal direction that is less than the width of the first portion in the longitudinal direction.

16. An electronic system comprising:

an electrical connector comprising:

a housing comprising a tower portion extending in a vertical direction and a slot, the slot comprising a first portion elongating in a longitudinal direction perpendicular to the vertical direction and a second portion extending in the tower portion in the vertical direction;

first and second members disposed in the tower portion of the housing and separate from each other, each of the first and second members comprising a first portion curving into the second portion of the slot of the housing; and a reinforcing member disposed in the tower portion of the housing, the reinforcing member separate from and at least partially surrounding the first and second members; and a component inserted into the slot of the housing and engaged by the first portions of the first and second members in the second portion of the slot of the housing.

17. The electronic system of claim 16, wherein:
the first portions of the first and second members engage an insulative surface portion of the component inserted into the slot of the housing.

18. The electronic system of claim 16, wherein:
the first portions of the first and second members engage the component from opposite sides.

19. The electronic system of claim 16, wherein:
the electrical connector further comprises a latch pivotably connected to the tower portion of the housing; and
the latch engages the component at a position farther away from a mounting surface of the electrical connector than the first portions of the first and second members in the vertical direction when the latch is in a locked position.

20. The electronic system of claim 16, wherein:
the electrical connector comprises a plurality of conductive elements having portions curving into the first portion of the slot; and
the component is engaged by the portions of the plurality of conductive elements in the first portion of the slot of the housing.

* * * * *